(12) United States Patent
Matsuzawa et al.

(10) Patent No.: US 11,351,844 B2
(45) Date of Patent: Jun. 7, 2022

(54) REGISTER

(71) Applicants: HOWA PLASTICS CO., LTD., Toyota (JP); KABUSHIKI KAISHA TOYOTA JIDOSHOKKI, Kariya (JP); TOYOTA JIDOSHA KABUSHIKI KAISHA, Toyota (JP)

(72) Inventors: Yosuke Matsuzawa, Toyota (JP); Hidekazu Makimura, Toyota (JP); Masayuki Komatsu, Kariya (JP); Hiroki Takada, Kariya (JP)

(73) Assignees: HOWA PLASTICS CO., LTD., Toyota (JP); KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 15/985,002

(22) Filed: May 21, 2018

(65) Prior Publication Data

US 2019/0001791 A1 Jan. 3, 2019

(30) Foreign Application Priority Data

Jun. 30, 2017 (JP) .............................. JP2017-129615

(51) Int. Cl.
*B60H 1/34* (2006.01)
*B60H 1/00* (2006.01)
(Continued)

(52) U.S. Cl.
CPC ......... *B60H 1/3428* (2013.01); *B60H 1/0065* (2013.01); *B60H 1/3435* (2013.01);
(Continued)

(58) Field of Classification Search
USPC ........................................................ 454/155
See application file for complete search history.

(56) References Cited

U.S. PATENT DOCUMENTS 3,662,668 A * 5/1972 Johnson ................ F24F 13/065
454/316
3,701,311 A * 10/1972 McLarty .............. B60H 1/3428
454/319

(Continued)

FOREIGN PATENT DOCUMENTS

CN        101900402 A    12/2010
CN        105252989 A    1/2016
(Continued)

OTHER PUBLICATIONS

Apr. 17, 2020 Office Action issued in German Patent Application No. 10 2018 115 438.0.

(Continued)

*Primary Examiner* — Edelmira Bosques
*Assistant Examiner* — Frances F. Hamilton
(74) *Attorney, Agent, or Firm* — Oliff PLC

(57) ABSTRACT

A register includes an annular fin that can improve the directivity of air conditioning air while suppressing increase in the number of parts. A front fin includes an annular-shaped annular fin portion. A bezel has upstream side inclined surfaces formed on inner peripheral surfaces facing with each other in the shorter side direction (vertical direction) of an air blow outlet. The upstream side inclined surfaces incline toward a direction of approaching the annular fin portion from an upstream side toward a downstream side of an air blowing direction. An air conditioning air flowing in the air blowing direction is guided to the annular fin portion side by the upstream side inclined surfaces.

6 Claims, 14 Drawing Sheets

(51) Int. Cl.
    *F24F 13/08*    (2006.01)
    *F24F 13/15*    (2006.01)
    *F24F 13/075*   (2006.01)

(52) U.S. Cl.
    CPC .......... *F24F 13/075* (2013.01); *F24F 13/082* (2013.01); *F24F 13/15* (2013.01); *B60H 2001/3471* (2013.01); *B60H 2001/3478* (2013.01)

(56) References Cited

U.S. PATENT DOCUMENTS

| | | | | |
|---|---|---|---|---|
| 8,662,970 | B2* | 3/2014 | Nagasaka | F24F 13/06 |
| | | | | 454/153 |
| 9,162,551 | B2* | 10/2015 | Yamamoto | B60H 1/3428 |
| 9,701,176 | B2* | 7/2017 | Jang | B60H 1/3428 |
| 10,414,246 | B2* | 9/2019 | Shibata | B60H 1/3421 |
| 10,792,976 | B2 | 10/2020 | Wada | |
| 2009/0215378 | A1 | 8/2009 | Terai et al. | |
| 2010/0304655 | A1* | 12/2010 | Nagasaka | B60H 1/3421 |
| | | | | 454/152 |
| 2011/0237176 | A1* | 9/2011 | Shibata | B60H 1/3428 |
| | | | | 454/330 |
| 2012/0291893 | A1* | 11/2012 | Yamamoto | B60H 1/3428 |
| | | | | 137/551 |
| 2013/0029582 | A1* | 1/2013 | Takai | F24F 13/075 |
| | | | | 454/284 |
| 2014/0302769 | A1* | 10/2014 | Sawada | F24F 13/082 |
| | | | | 454/315 |
| 2015/0065031 | A1* | 3/2015 | Shibata | B60H 1/3421 |
| | | | | 454/322 |
| 2015/0328959 | A1* | 11/2015 | Suzuki | B60H 1/3421 |
| | | | | 454/155 |
| 2016/0009163 | A1 | 1/2016 | Terai et al. | |
| 2016/0200167 | A1* | 7/2016 | Wada | B60H 1/3414 |
| | | | | 454/152 |
| 2017/0057327 | A1* | 3/2017 | Shibata | B60H 1/3421 |
| 2017/0176045 | A1* | 6/2017 | Terai | B60H 1/3421 |
| 2017/0361683 | A1* | 12/2017 | Brinas | B60H 1/3421 |
| 2019/0118620 | A1* | 4/2019 | Lee | B60H 1/345 |

FOREIGN PATENT DOCUMENTS

| | | | |
|---|---|---|---|
| CN | 105774475 A | 7/2016 | |
| DE | 103 39 339 A1 | 3/2005 | |
| DE | 20 2010 000 445 U1 | 7/2010 | |
| DE | 10 2017 103 760 A1 | 8/2018 | |
| JP | 59119158 A * | 10/1984 | |
| JP | H03-124904 U | 12/1991 | |
| JP | 3264172 B2 | 3/2002 | |
| JP | 2004-203176 A | 7/2004 | |
| JP | 2011-006054 A | 1/2011 | |
| JP | 2011-235668 A | 11/2011 | |
| JP | 2011235668 A * | 11/2011 | |
| JP | 5502591 B2 | 5/2014 | |
| JP | 5577108 B2 | 8/2014 | |
| JP | 2015044505 A * | 3/2015 | ........... B60H 1/3421 |
| JP | 2016-130067 A | 7/2016 | |
| JP | 6260543 B2 | 1/2018 | |

OTHER PUBLICATIONS

Apr. 6, 2021 Office Action issued in Japanese Patent Application No. 2017-129615.
May 8, 2021 Office Action issued in Chinese Patent Application No. 201810688367.5.
Oct. 26, 2021 Office Action issued in Japanese Patent Application No. 2017-129615.
Dec. 31, 2021 Office Action issued in Chinese Patent Application No. 201810688367.5.

\* cited by examiner

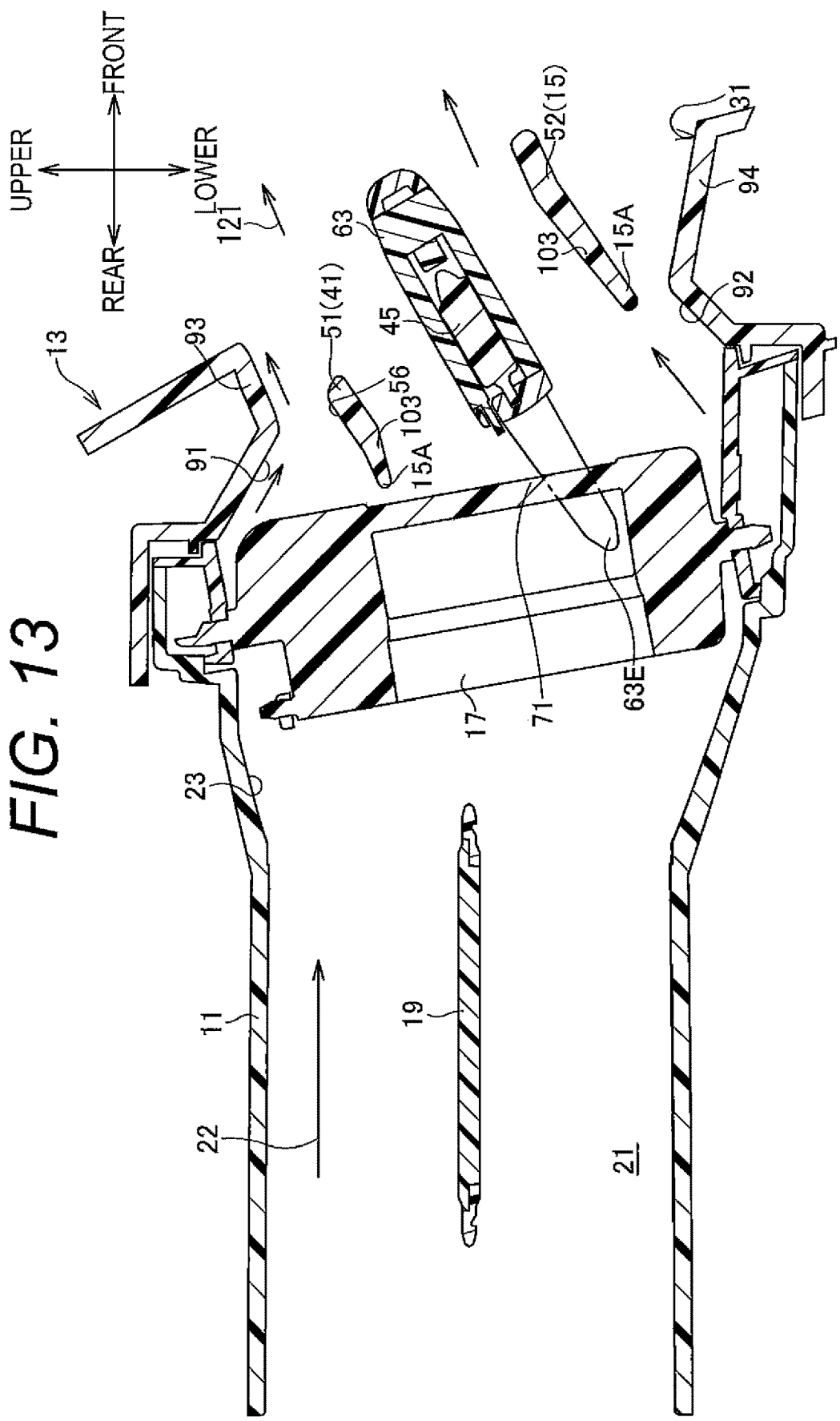

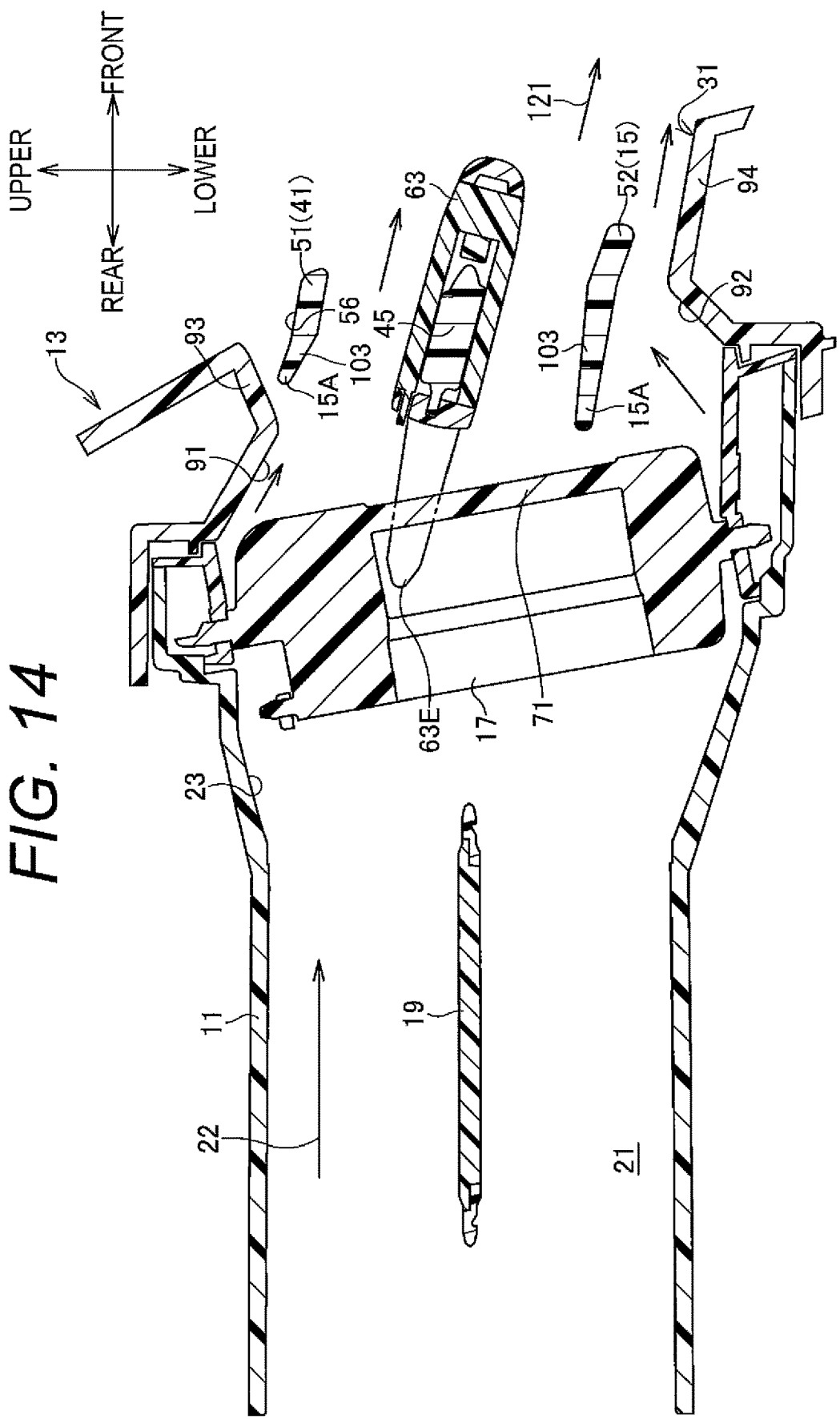

REGISTER

CROSS-REFERENCE TO RELATED APPLICATIONS

This application is based upon and claims the benefit of priority of the prior Japanese Patent Application No. 2017-129615, filed on Jun. 30, 2017, the entire contents of which are incorporated herein by reference.

FIELD

The present invention relates to a register used for an air blow outlet for ventilation and air conditioning of an automobile.

BACKGROUND

Conventionally, there is a register arranged in an instrument panel of an automobile and used for an air blow outlet for blowing out air conditioning air adjusted by an air conditioning device into a cabin of an automobile (see, for example, Patent Document 1). The register disclosed in the Patent Document 1 is provided with a front fin inside a narrow and long air blow outlet. The front fin includes an annular fin portion extended in the longitudinal direction of the air blow outlet and a guide plate arranged inside the annular fin portion and extended in the longitudinal direction. Both end portions of the guide plate in the longitudinal direction are connected to an inner peripheral surface of the annular fin portion. An operation knob is slidably attached to the guide plate. The front fin is turnably held at a front end portion of a retainer by a shaft portion protruded from an outer peripheral surface of the annular fin portion. A user operates the operation knob and turns the front fin in the shorter side direction of the air blow outlet to turn the annular fin portion and the guide plate, thereby adjusting a blowout direction of air conditioning air.

[Patent Literature 1] Japanese Laid-open Patent Publication No. 2011-148455

SUMMARY

According to an aspect of the embodiments, a register comprising: a bezel formed with a narrow air blow outlet long in one direction; a retainer having a cylindrical shape communicating with the air blow outlet and blowing an air conditioning air in an air blowing direction toward the air blow outlet; and a movable fin provided inside the air blow outlet, wherein the movable fin includes: an annular fin portion having an annular shape with a through hole formed so as to penetrate in the air blowing direction and extended in a longitudinal direction of the air blow outlet; and a shaft portion provided at an outer peripheral portion of the annular fin portion and turnably supporting the annular fin portion, wherein the bezel includes an upstream side inclined surface formed on at least one of the inner peripheral surfaces facing with each other in a shorter side direction of the air blow outlet, and the upstream side inclined surface inclines toward a direction of approaching the annular fin portion from an upstream side to a downstream side of the air blowing direction.

The object and advantages of the invention will be realized and attained by means of the elements and combinations particularly pointed out in the claims. It is to be understood that both the forgoing general description and the following detailed description are exemplary and explanatory and are not restrictive of the invention.

BRIEF DESCRIPTION OF DRAWINGS

FIG. 13 is a sectional view showing a state where the operation knob is turned to the upper side to adjust the blowout direction of the air conditioning air to the upper side; and FIG. 14 is a sectional view showing a state where the operation knob is turned to the lower side to adjust the blowout direction of the air conditioning air to the lower side.

DESCRIPTION OF EMBODIMENTS

For example in a register as described above, a speed of the air conditioning air may be accelerated at a portion where a ventilation flue is narrow. Specifically, for example, in a register provided with the above-mentioned narrow and long air blow outlet, a width of the ventilation flue is narrow in the shorter side direction, and a flow of the air conditioning air is changed in this narrow ventilation flue. When the air conditioning air having a certain degree of blow pressure is blown, in passing through the ventilation flue, the flow of the air conditioning air is narrowed in the shorter side direction, and the air conditioning air is accelerated in the air blowing direction of the ventilation flue.

For example, the ventilation flue is narrow at a portion sandwiched between the outer peripheral surface of the annular fin portion of the front fin and an inner peripheral surface of the air blow outlet in the shorter side direction. Thus, the air conditioning air is accelerated in flowing outside the annular fin portion. When the direction of the front fin is changed in the shorter side direction of the air blow outlet, the air conditioning air whose air blowing direction is changed by the front fin after passing through the annular fin portion is influenced by the air conditioning air accelerated after passing through a space outside the annular fin portion, i.e. the narrow ventilation flue. The air conditioning air hardly flows in the direction toward which the front fin is turned. As a result, the blow out direction cannot be changed sufficiently, causing a risk of deteriorating the directivity of the air conditioning air.

Meanwhile, when an auxiliary fin turned interlocking with the annular fin portion is provided outside the annular fin portion, the air conditioning air that passed through the space outside the annular fin portion is easy to flow in the direction toward which the front fin is turned by the auxiliary fin. However, it is necessary to provide the auxiliary fin and a link member for interlocking the auxiliary fin in order to ensure the directivity, causing increase in the number of parts.

Figure 1:
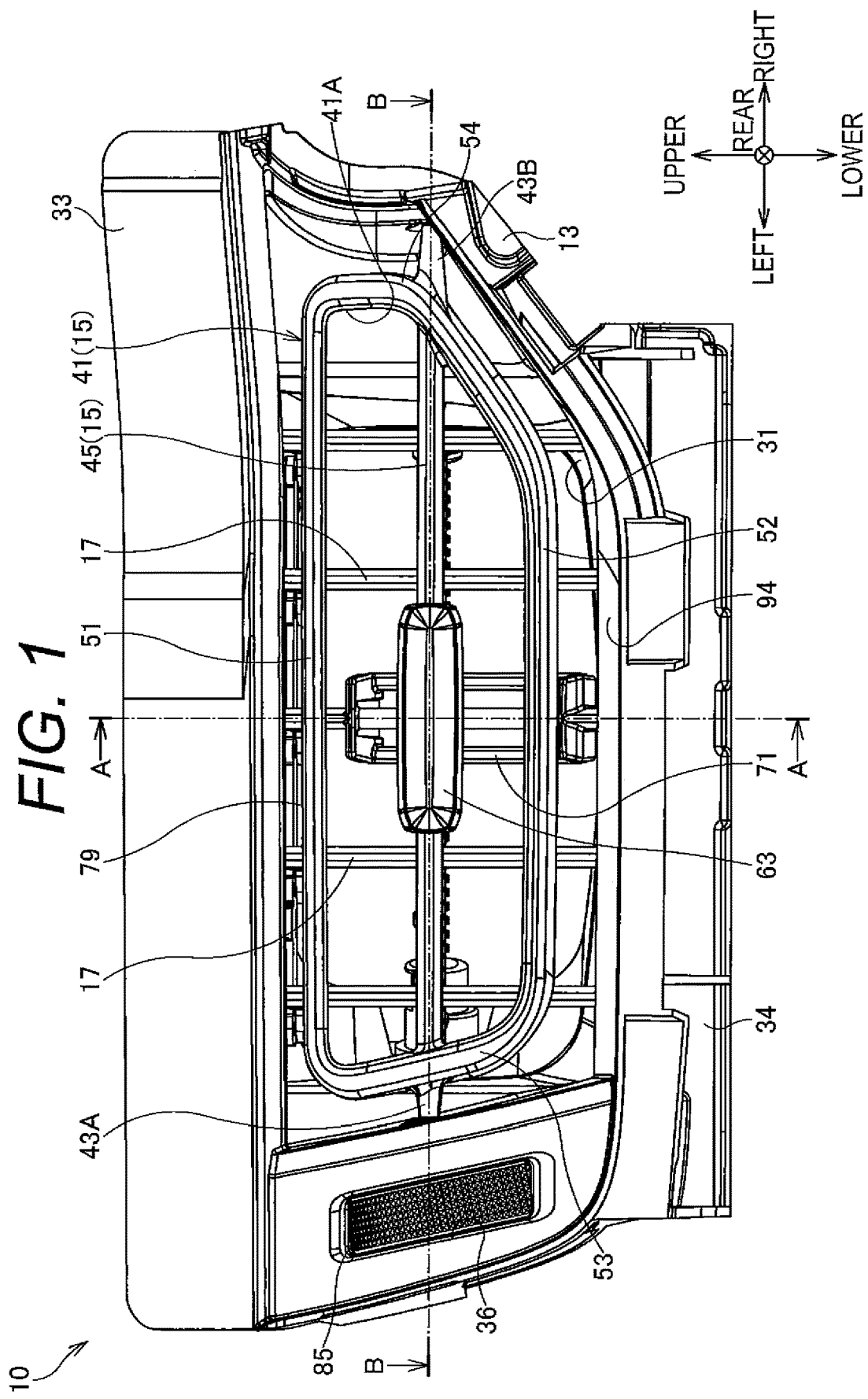
FIG. 1 is a front view of a register showing an embodiment.

Hereinafter, a register 10 according to one embodiment of the present invention will be described with reference to drawings. The register 10 is arranged in an instrument panel disposed on the front side of a vehicle compartment, and blows out air conditioning air adjusted by an air conditioning device inside the vehicle compartment. In the description below, as shown in FIG. 1, a downstream side in the air blowing direction (i.e. a vehicle compartment side) in the register 10 according to the present embodiment is the front side, and an upstream side in the air blowing direction (i.e. an air conditioning device side) is the rear side. In addition, in the description below, the vertical direction and the lateral direction are defined and explained using a user's view point facing the register 10 on the front side of the register 10. FIG. 1 shows a state where an operation knob 63 is disposed at an initial position, front fin 15 are placed along the lateral direction, rear fins 17 are placed along the vertical direction, and the blow out direction of the air conditioning air is not changed (hereinafter referred to as a neutral state).

(Structure of the Register)

Figure 2:
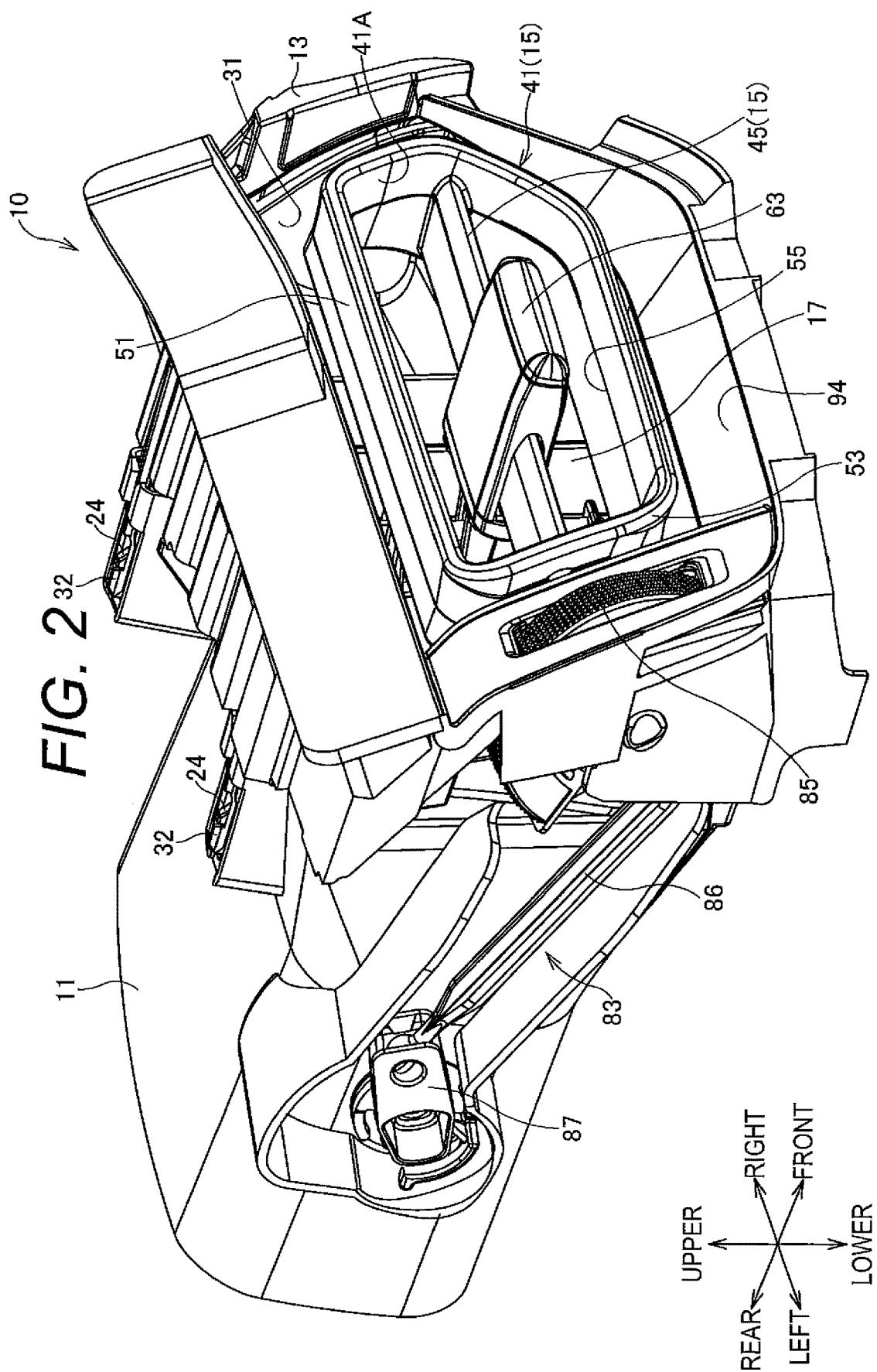
FIG. 2 is an external perspective view of the register.
Figure 3:
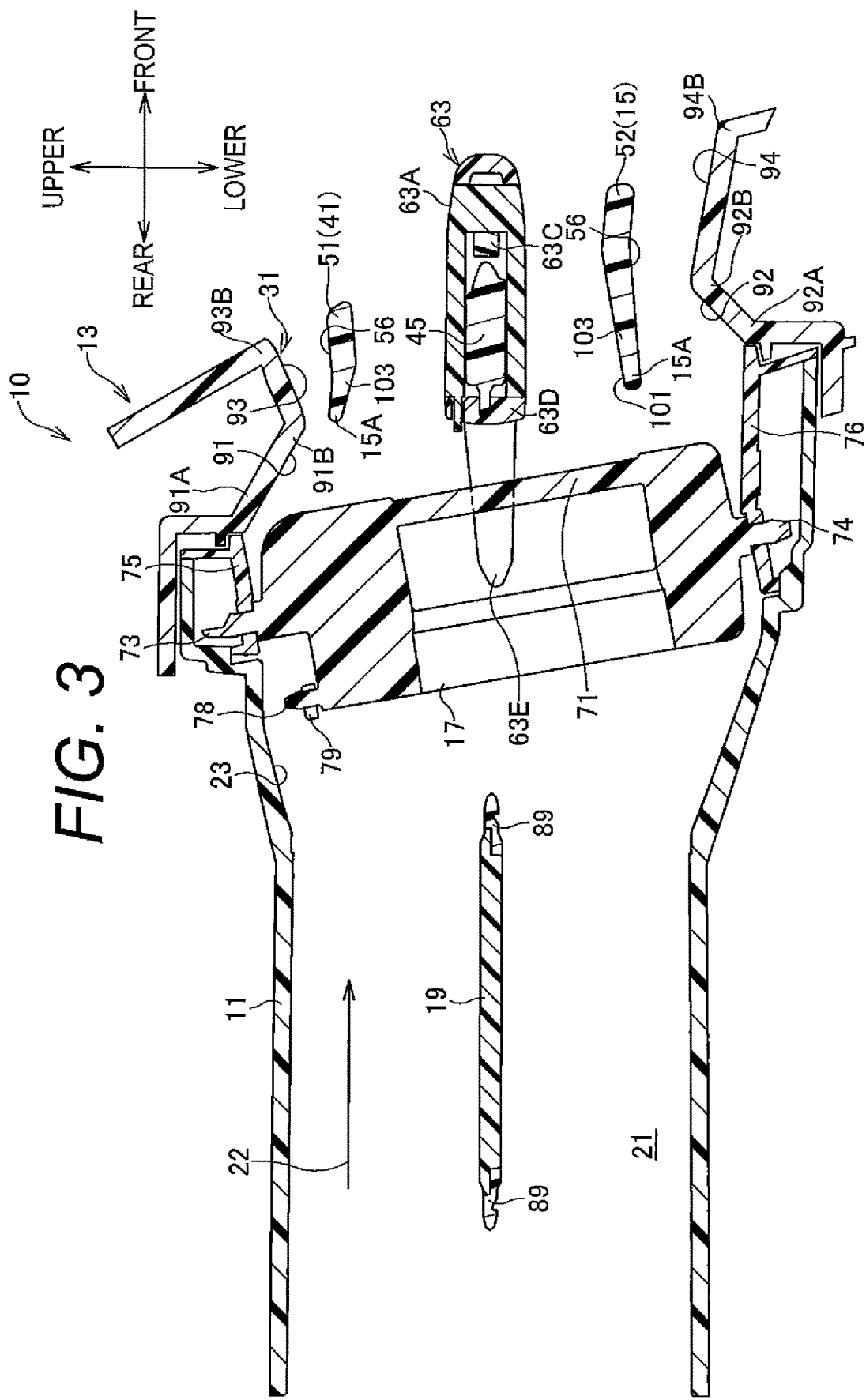
FIG. 3 is a sectional view showing a section taken along a line A-A of FIG. 1.
Figure 4:
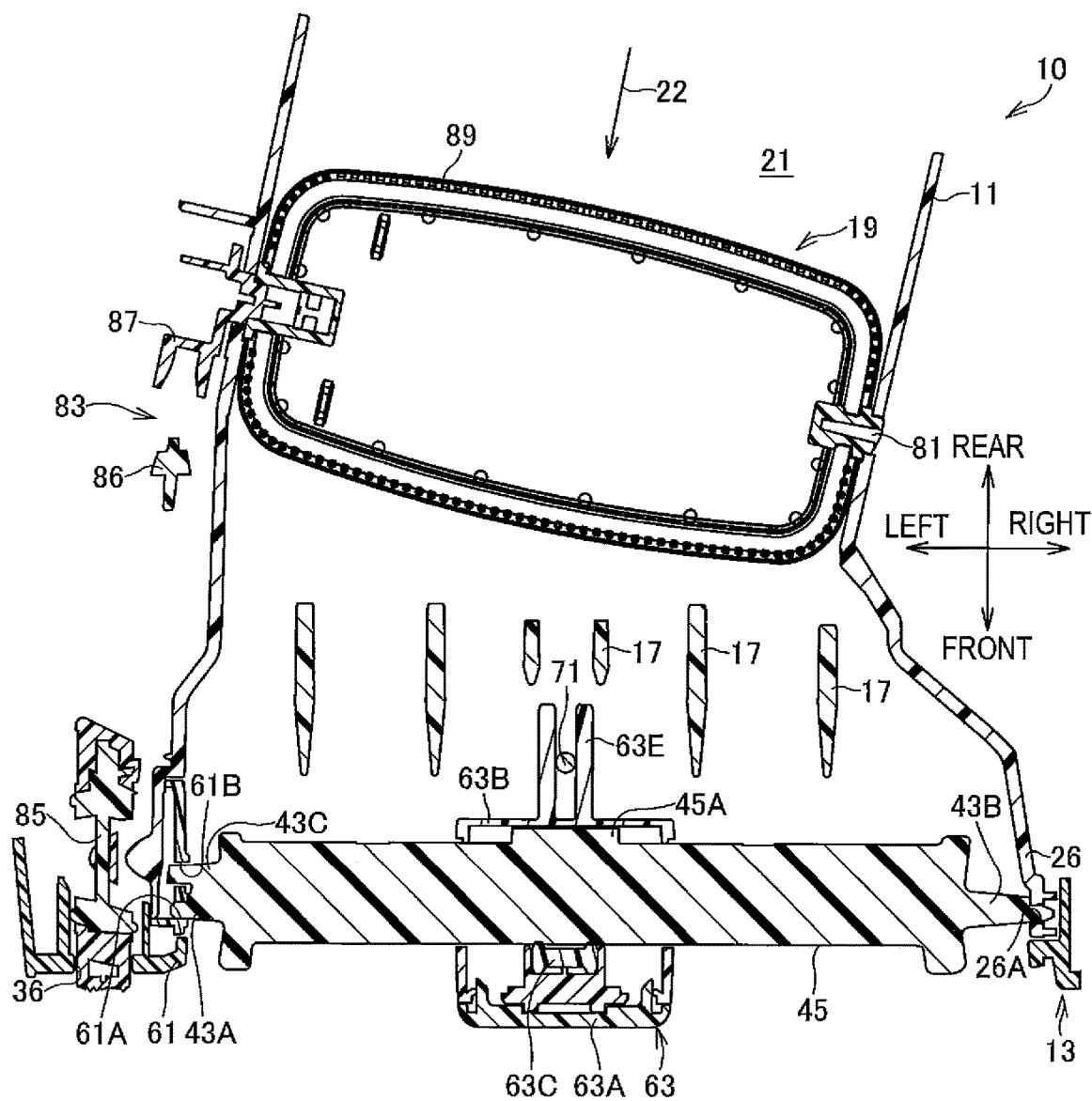
FIG. 4 is a sectional view showing a section taken along a line B-B of FIG. 1.

FIG. 1 is a front view of the register 10 according to the present embodiment. FIG. 2 is an external perspective view of the register 10. FIG. 3 is a sectional view showing a section taken along a line A-A of FIG. 1. FIG. 4 is a sectional view showing a section taken along a line B-B of FIG. 1. The register 10 according to the present embodiment blows out the conditioning air adjusted by the air conditioning device inside the vehicle compartment. As shown in FIGS. 1-4, the register 10 includes a retainer 11, a bezel 13, front fin 15, rear fins 17, and a damper plate 19 etc.

The retainer 11 has a cylindrical shape extending in the front-rear direction. A ventilation flue 21 is formed inside the retainer 11 (see FIG. 3). A rear end of the retainer 11 is connected to the air conditioning device (not shown) via the ventilation flue 21. A narrow air blow outlet 31 long in the lateral direction (one example of one direction) is formed in the bezel 13. The retainer 11 has a cylindrical shape communicating with the air blow outlet 31 of the bezel 13, and blows the air conditioning air in a direction toward the air blow outlet 31 i.e. an air blowing direction 22. The ventilation flue 21 (retainer 11) has a cross-sectional shape taken along a plane perpendicular to the air blowing direction 22, the cross-sectional shape formed in a substantially rectangular shape long in the lateral direction.

Figure 5:
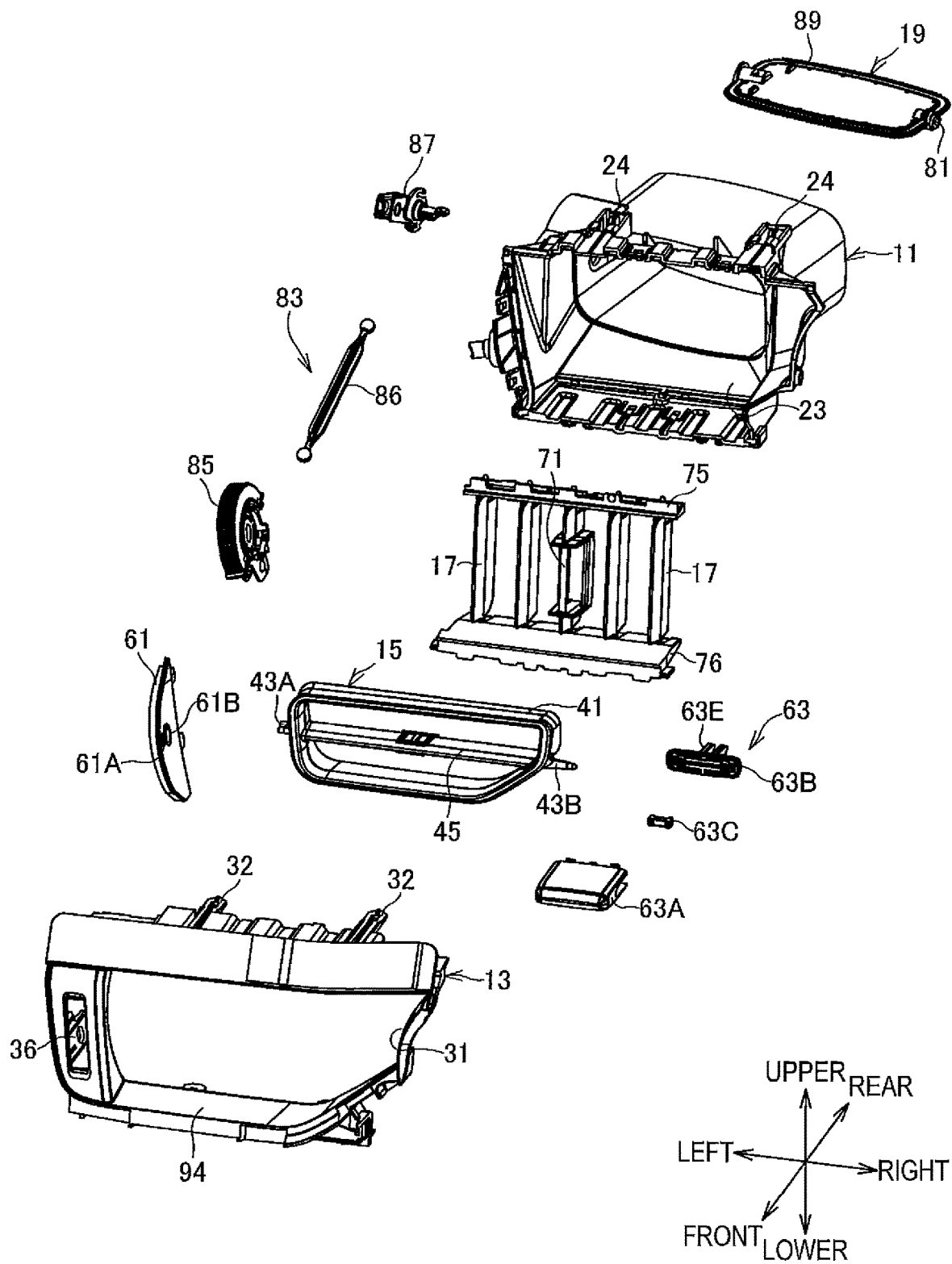
FIG. 5 is an exploded perspective view of the register.

FIG. 5 is an exploded perspective view of the register 10. As shown in FIGS. 4 and 5, the retainer 11 has a cylindrical shape bent in a direction (in the present embodiment, the rear side aslant on the right) of forming a prescribed angle to the front-rear direction. This shape enables the air conditioning air flowing toward the air blowing direction 22 in the ventilation flue 21 to hit an inner wall of the bent retainer 11 and accelerate. As a result, the accelerated air conditioning air hits the rear fins 17 described later, improving the directivity of the air conditioning air in the lateral direction.

As shown in FIGS. 1-4, the bezel 13 is a member arranged on a front surface of the retainer 11. The bezel 13 has the air blow outlet 31 formed into a shape long in the lateral direction and is attached to an opening on a front side (downstream side) of the retainer 11, i.e. a downstream side opening 23 (see FIG. 5). The bezel 13 is formed with the air blow outlet 31 having a size corresponding to the downstream side opening 23 and is a member like a frame covering a peripheral edge of the downstream side opening 23 from a front surface. The bezel 13 is fixed to the retainer 11 by engaging a hole of an engaged part 32 with a projection of an engaging part 24 of the retainer 11. For example, the two engaged parts 32 according to the present embodiment are provided on an upper edge and a lower edge of the bezel 13, respectively. The air blow outlet 31 is a hole for blowing out the air conditioning air adjusted by the air conditioning device and flowing in the ventilation flue 21 toward the outside of the register 10 (a side of a user such as an occupant). The air blow outlet 31 according to the present embodiment has a shape long in the lateral direction and a narrow and long shape short in the vertical direction, and a width thereof is narrow in the vertical direction at a right side portion (see FIG. 1).

(Structure of the Front Fin 15)

The front fin 15 is arranged on an inner side of the air blow outlet 31 of the bezel 13 (a connection part of the bezel 13 and the retainer 11). The front fin 15 (one example of a movable fin) has an annular fin portion 41, fin shafts 43A, 43B, and a guide fin 45. The annular fin portion 41 is formed into an annular shape having a through hole 41A formed so as to penetrate in a front-rear direction (the air blowing direction 22) and is extended along a longitudinal direction (lateral direction) of the air blow outlet 31.

The annular fin portion 41 has a shape corresponding to a shape of the air blow outlet 31, i.e. a shape long in the lateral direction and a narrow and long shape short in the vertical direction (a substantially oval shape long in the lateral direction when viewed from the front side), and a width thereof in the vertical direction is narrow at a right side portion (see FIG. 1). The annular fin portion 41 has a structure wherein plate members having a prescribed width in the front-rear direction are connected annularly. The annular fin portion 41 has an upper flat portion 51 and a lower flat portion 52 facing with each other in the vertical direction. The annular fin portion 41 has a left side portion 53 connecting a left end of the upper flat portion 51 and a left end of the lower flat portion 52 and a right side portion 54 connecting a right end of the upper flat portion 51 and a right end of the lower flat portion 52.

Figure 6:
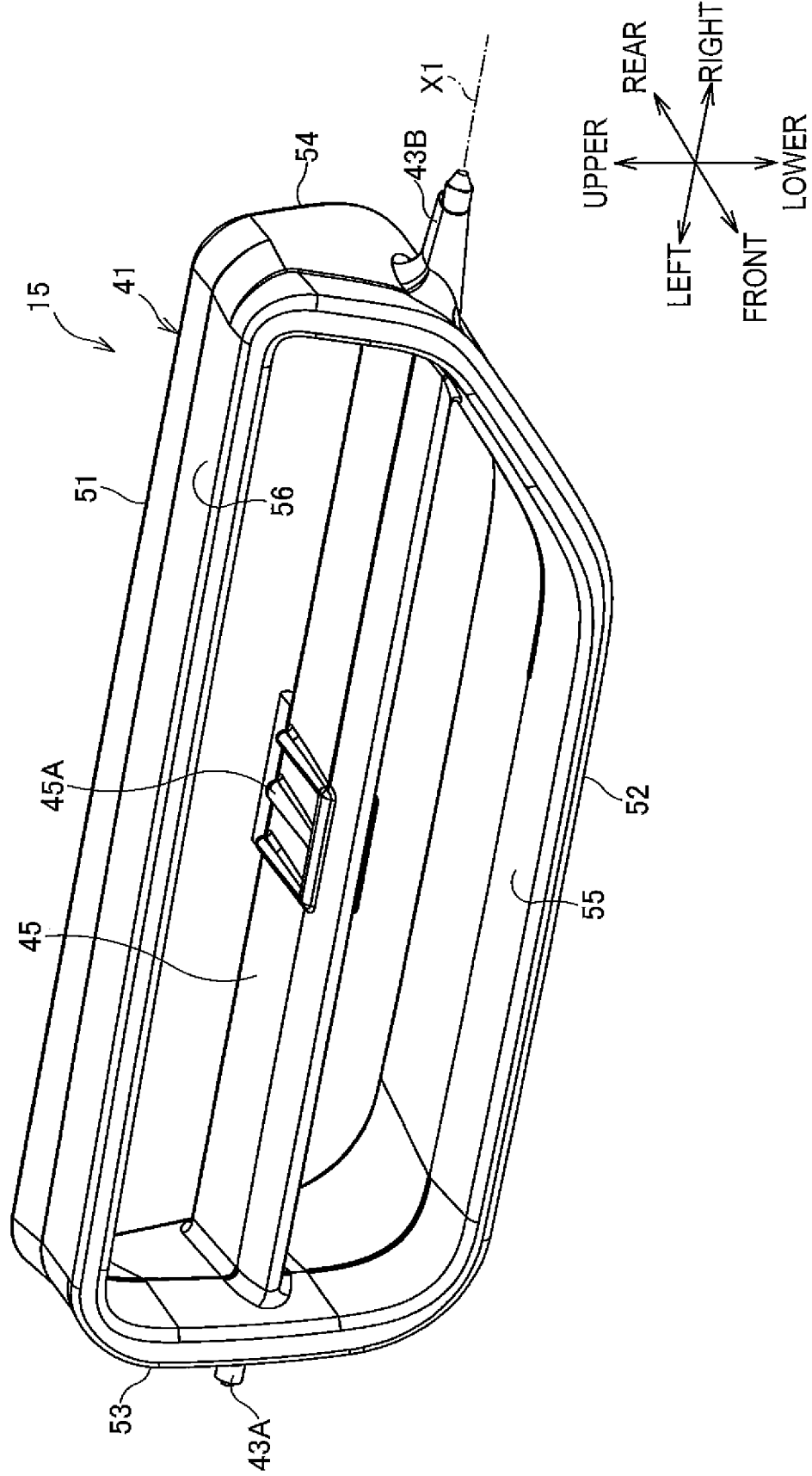
FIG. 6 is a perspective view of a front fin seen from the front side.
Figure 7:
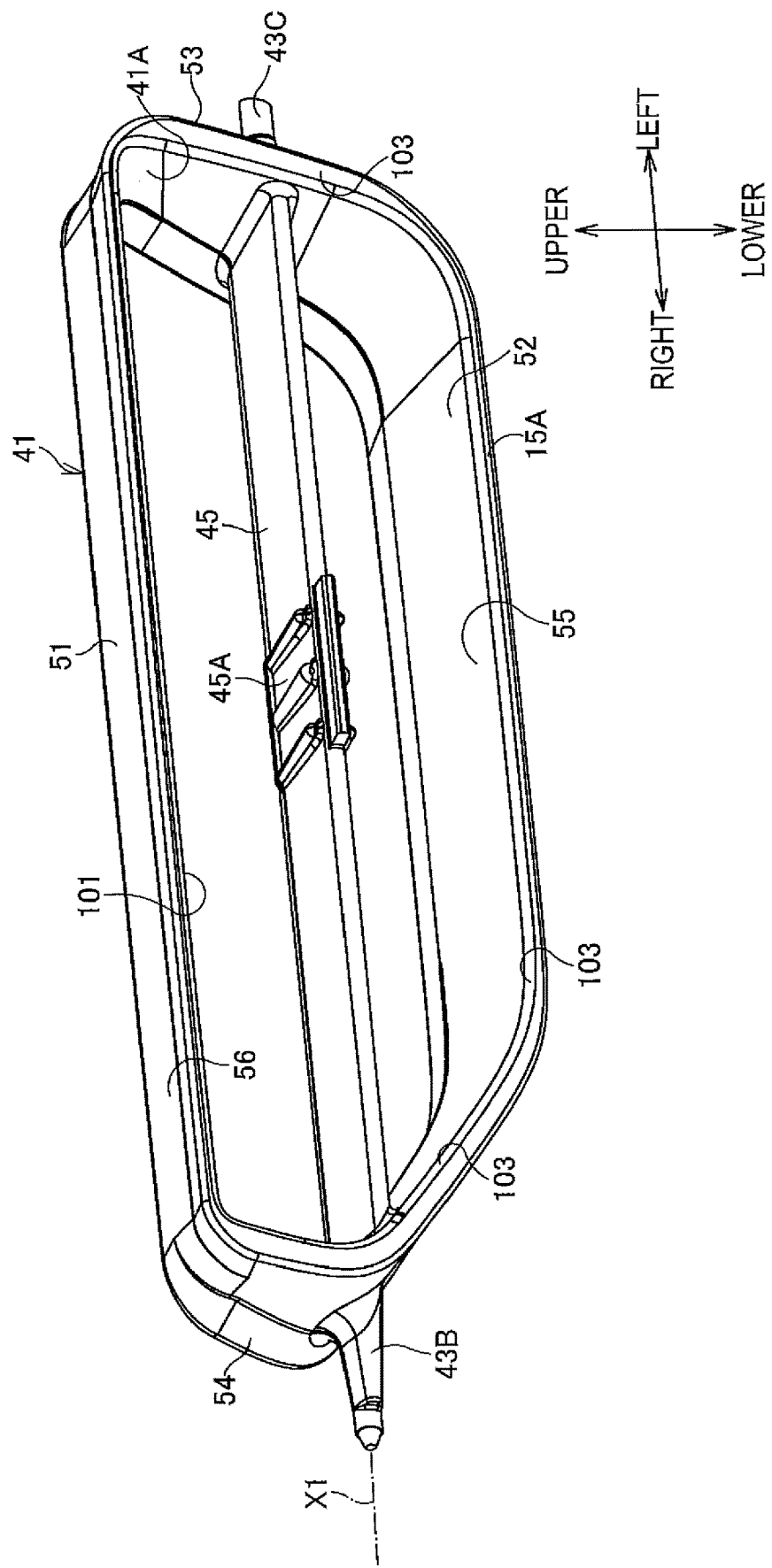
FIG. 7 is a perspective view of the front fin seen from the rear side.
Figure 8:
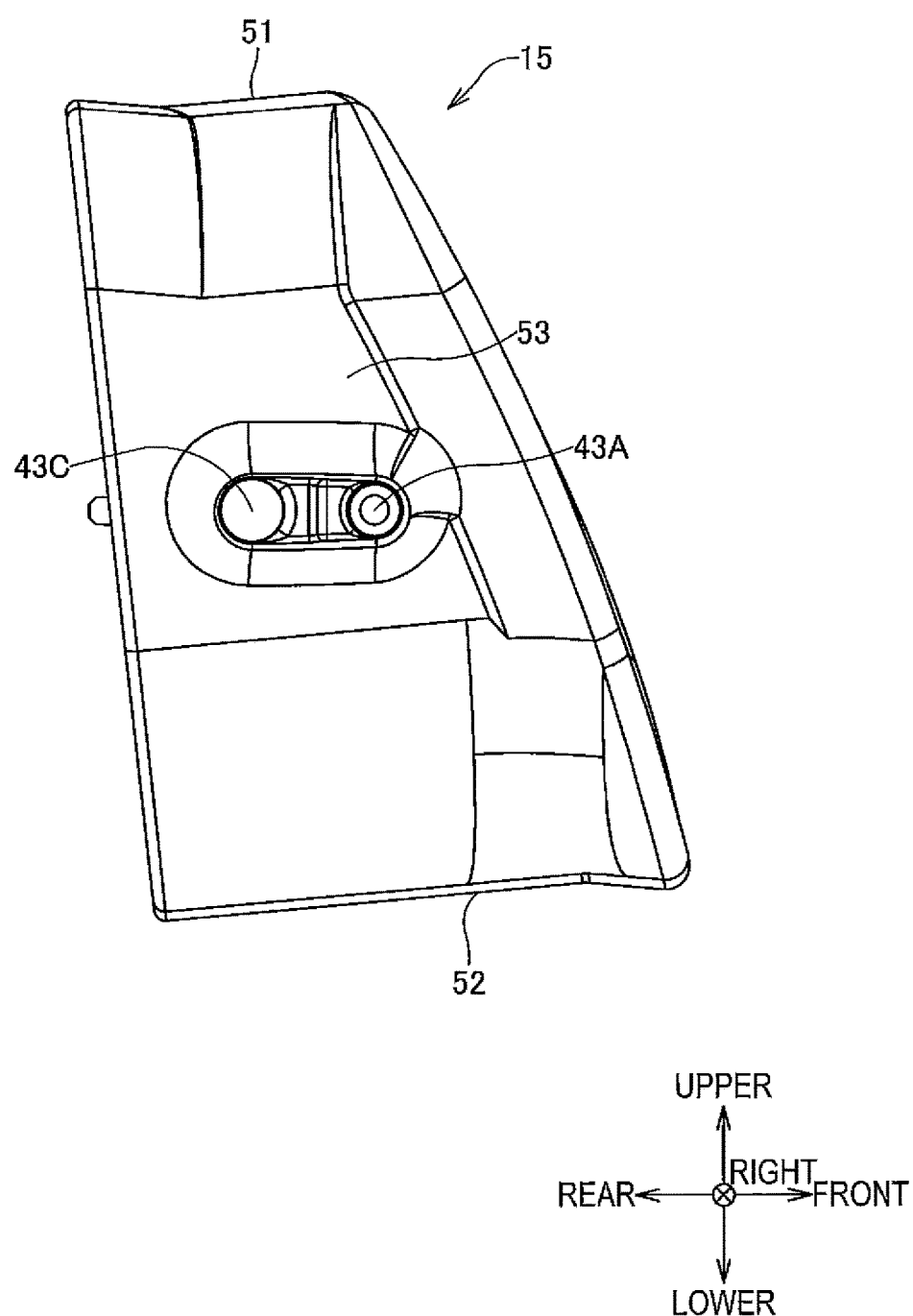
FIG. 8 is a left side view of the front fin.

FIG. 6 is a perspective view of the front fin 15 seen from an upper side aslant on the right on the front side. FIG. 7 is a perspective view of the front fin 15 seen from an upper side aslant on the right on the rear side. FIG. 8 is a left side view of the front fin 15. As shown in FIGS. 6-8, the upper flat portion 51 has a plate shape extended along the lateral direction with a width in the front-rear direction substantially constant. As in the case with the upper flat portion 51, the lower flat portion 52 has a plate shape extended along the lateral direction with a width in the front-rear direction substantially constant, and is bent upward at an end portion on the right side. The upper flat portion 51 and the lower flat portion 52 have each fin inner peripheral surface 55 facing with each other in the vertical direction (thickness direction of the upper flat portion 51 and the lower flat portion 52). The upper flat portion 51 and the lower flat portion 52 facing with each other in the vertical direction are arranged in almost parallel with each other except for a right side portion.

Figure 9:
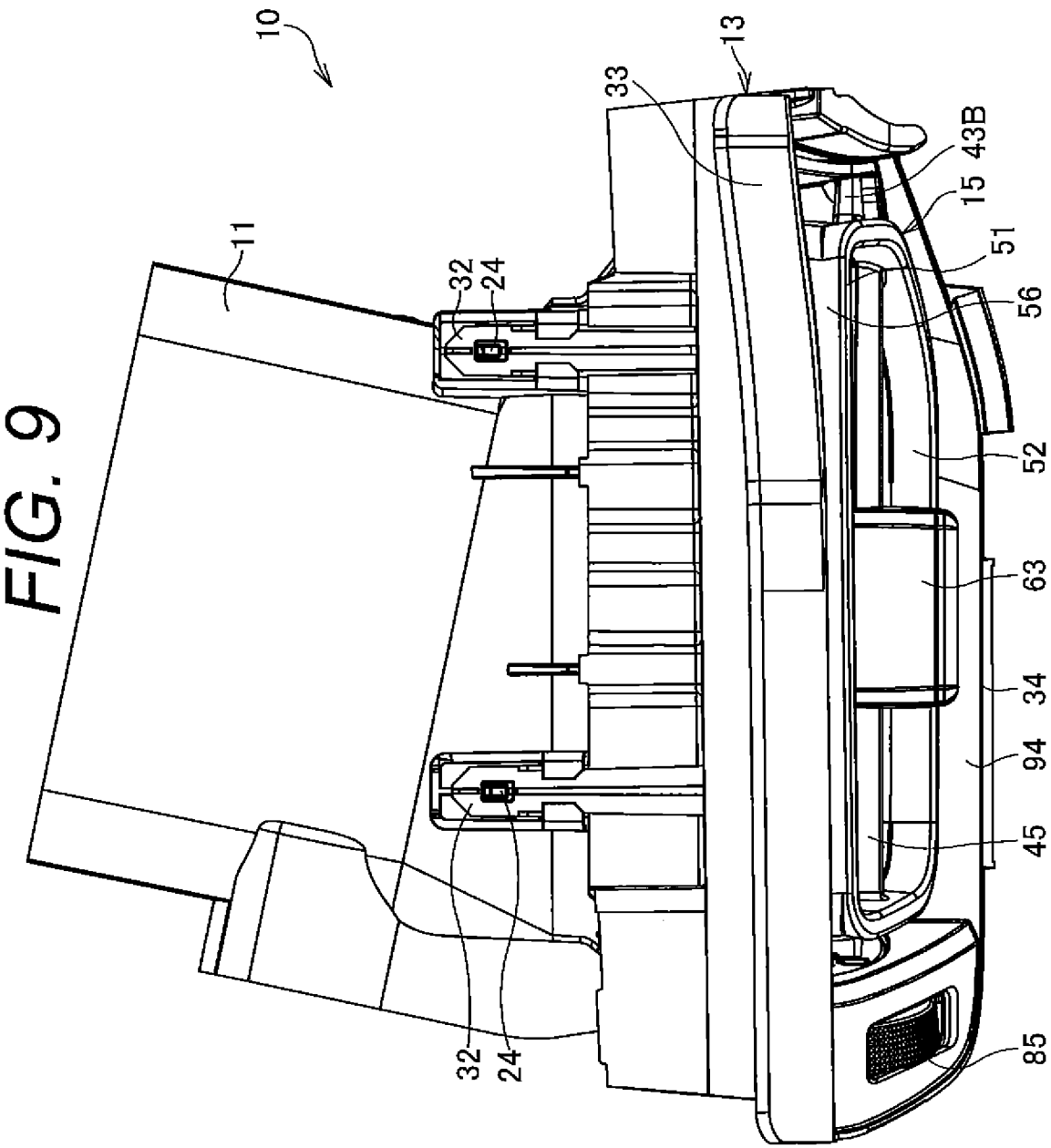
FIG. 9 is a top view of the register.

A length in the front-rear direction of the lower flat portion 52 according to the present embodiment is longer than the upper flat portion 51. FIG. 9 is a top view of the register 10. As shown in FIG. 9, in a neutral state, a front end portion of the lower flat portion 52 (end portion on the downstream side) is positioned on the front side relative to a front end portion of the upper flat portion 51. The upper flat portion 51 is arranged at a positon facing an upper frame portion 33 of the bezel 13 in the vertical direction. A fin outer peripheral surface 56 of the upper flat portion 51 faces an inner peripheral surface of the upper frame portion 33 in the vertical direction. The lower flat portion 52 is arranged at a position facing a lower frame portion 34 of the bezel 13 in the vertical direction. A fin outer peripheral surface 56 of the lower flat portion 52 faces an inner peripheral surface of the lower frame portion 34 in the vertical direction. Accordingly, in the bezel 13 according to the present embodiment, in a neutral state, a front end portion of the lower frame portion 34 (end portion on the downstream side) is positioned on the front side relative to the front end portion of the upper flat portion 51. As shown in FIG. 2, a front surface of the register 10 according to the present embodiment is slanted toward the front side from the upper side to the lower side and has a lower end portion protruded toward the front side relative to the upper end portion. This improves a design effect of the register 10 seen from the front side (vehicle compartment side). A configuration may be accepted wherein front end portions of the upper flat portion 51 and the lower flat portion 52 are at the same positions in the front-rear direction, and the front surface of the register 10 is not slanted.

As shown in FIGS. 6-8, the left side portion 53 has an upper end connected to the left end portion of the upper flat portion 51 and a lower end connected to the left end portion of the lower flat portion 52. A width of the left side portion 53 in the front-rear direction is gradually increased from the upper side to the lower side corresponding to the widths of the upper flat portion 51 and the lower flat portion 52 (see FIG. 8). A fin shaft 43A is provided at the left side portion 53 and protrudes toward the left side (outside) from the fin outer peripheral surface 56 of the left side portion 53. A turning axis of the fin shaft 43A (an axial direction X1) is in a direction along the lateral direction. The fin shaft 43A is inserted into an insertion hole 61A provided in a bearing member 61 held by the bezel 13 and the retainer 11 (see FIGS. 4 and 5) and is turnably attached to the bearing member 61 (bezel 61 and the retainer 11).

As in the case with the left side portion 53, the right side portion 54 of the annular fin portion 41 has an upper end connected to the right end portion of the upper flat portion 51 and a lower end connected to the right end portion bent on the right upward side of the lower flat portion 52. A fin shaft 43B is provided in the right side portion 54 and protrudes toward the right side (outside) from the fin outer peripheral surface 56 of the right side portion 54. A turning axis (the axial direction X1) of the fin shaft 43B is in the direction along the lateral direction. The fin shaft 43B is inserted into an insertion hole 26A provided on a side wall 26 (see FIG. 4) on the right side of the retainer 11 and is turnably attached to the side wall 26 (retainer 11).

The two fin shafts 43A, 43B are provided at an outer peripheral portion of the annular fin portion 41 (the fin outer peripheral surface 56) and a center part of the front fin 15 in the vertical direction, respectively. The front fin 15 can be turnable around the axial direction X1 of the two fin shafts 43A, 43B, i.e. around the axial direction X1 along the lateral direction toward the vertical direction. As shown in FIG. 8, an auxiliary support shaft 43C other than the fin shaft 43A is provided in the left side portion 53. The auxiliary support shaft 43C is arranged at a position on the upstream side relative to the fin shaft 43A. The auxiliary support shaft 43C is inserted into an insertion hole 61B of the bearing member 61 (see FIGS. 4 and 5). The insertion hole 61B is larger than the insertion hole 61A into which the fin shaft 43A is inserted, for example, is expanded in the vertical direction. Turning of the front fin 15 according to the present embodiment in the vertical direction is restricted by engaging the auxiliary support shaft 43C with the insertion hole 61B.

As shown in FIGS. 6-8, the guide fin 45 is provided inside the annular fin portion 41, and is provided at a center part of the front fin 15, i.e. a position corresponding to the fin shafts 43A, 43B. The guide fin 45 has a plate shape extended along the lateral direction, i.e. the axial direction X1 of the fin shafts 43A, 43B. The guide fin 45 has a width substantially same as a width in the front-rear direction of the right side portion 54 and the left side portion 53. Both end portions of the guide fin 45 in the lateral direction are connected to the fin inner peripheral surface 55 of the annular fin portion 41 (the right side portion 54 and the left side portion 53).

The operation knob 63 is attached to the guide fin 45. As shown in FIG. 5, the operation knob 63 includes a cover 63A, a rear cover 63B, and a support member 63C. The operation knob 63 is attached slidably in the lateral direction with respect to the guide fin 45 by inserting the guide fin 45 into an insertion hole formed by assembling the cover 63A and the rear cover 63B. The cover 63A and the rear cover 63B cover the guide fin 45 in an assembled state. The support member 63C is arranged on the front side of the guide fin 45 and determines a position of the operation knob 63 in the front-rear direction. The operation knob 63 is prevented from moving in the lateral direction within a fixed range by engaging an engaging part 45A formed at a center part of the guide fin 45 with the rear cover 63B (see FIG. 4).

In the register 10 according to the present embodiment, the front fin 15 (the annular fin portion 41 and the guide fin 45) turns in the vertical direction by operating the operation knob 63 in the vertical direction. Thereby, the upper flat portion 51, the guide fin 45, and the lower flat portion 52 arranged in order from an upper side to a lower side turn in interlock with each other in the vertical direction. As a result, the blow out direction of the air conditioning air blown out from the air blow outlet 31 is adjusted in the vertical direction.

(Structure of the Rear Fin 17)

As shown in FIG. 5, a plurality of the rear fins 17 (in the present embodiment, five) are arranged inside the downstream side opening 23 of the retainer 11. The plurality of the rear fins 17 are arranged on the rear side (upstream side) of the front fin 15. Each of the rear fins 17 has a substantially plate shape extending in the vertical direction and having a plane along the vertical direction and the front-rear direction. Each of the rear fins 17 has a pair of the planes facing with each other in the thickness direction, the pair of the planes facing with each other in the lateral direction and is arranged in parallel with each other.

A link mechanism 71 connected to an arm 63E provided in the rear cover 63B of the operation knob 63 is formed in the rear fin 17 arranged at the center of the plurality of the rear fins 17 in the lateral direction. The arm 63E is formed so as to extend in a bifurcated shape toward the rear side and is provided so that the bifurcated arm 63E sandwiches a connection rod extending in the vertical direction of the link mechanism 71 from the lateral direction. Thereby, a power for turning in the lateral direction in accordance with slide-movement of the operation knob 63 in the lateral direction is transmitted to the central rear fin 17 via the bifurcated arm 63E and the link mechanism 71. The rear fins 17 other than the central rear fin 17 have substantially the same structure as the central rear fin 17 except for the link mechanism 71.

As shown in FIG. 3, an upper turning support shaft 73 is provided at an upper end of the each rear fin 17, i.e. a center part in the front-rear direction. The upper turning support shaft 73 protrudes upward from the upper end of the rear fin 17. Likewise, a lower turning support shaft 74 is provided at a lower end of the each rear fin 17, i.e. a center part in the front-rear direction. The lower turning support shaft 74 protrudes downward from the lower end of the rear fin 17. The upper turning support shaft 73 is attached turnably with respect to a bearing member 75 (see FIG. 5) attached to an upper part of the downstream side opening 23 of the retainer 11. Likewise, the lower turning support shaft 74 is attached turnably with respect to a bearing member 76 (see FIG. 5) attached to a lower part of the downstream side opening 23 of the retainer 11. Thereby, each of the rear fins 17 can turn around a turning axis connecting the upper turning support shaft 73 and the lower turning support shaft 74 in the lateral direction. The rear fin 17 according to the present embodiment has the upper end arranged at the rear side relative to the lower end thereof and is in a state where the turning axis is turned by a prescribed angle counterclockwise in FIG. 3 from a position along the vertical direction. Accordingly, the rear fin 17 is arranged turnably in a state where the upper end is inclined toward the rear side.

A protrusion part 78 protruding upward is formed at the upper end of the each rear fin 17, i.e. a part on the rear side thereof. The protrusion parts 78 of the each rear fin 17 are connected with each other by a link member 79 (see FIG. 1) extended in the lateral direction. Therefore, when one of the rear fins 17 turns in the lateral direction, the other all rear fins 17 interlockingly turn in the lateral direction. When the central rear fin 17 in the lateral direction turns in accordance with the slide-movement of the operation knob 63, the other rear fins 17 turn in interlock with the central rear fin 17 in the lateral direction. Accordingly, in the register 10 according to the present embodiment, the blow out direction of the air conditioning air blown out from the air blow outlet 31 can be adjusted to the lateral direction by slide-moving the operation knob 63 to turn all the rear fins 17 in the lateral direction.

(Structure of the Damper Plate 19)

As shown in FIGS. 4 and 5, the damper plate 19 is provided at the rear side (upstream side) of the rear fin 17, i.e. inside the ventilation flue 21 of the retainer 11. The damper plate 19 turns to open/close the ventilation flue 21 and supplies or stops the air conditioning air. The damper plate 19 is formed so as to be matched with a shape of the ventilation flue 21 and has a substantially rectangular shape long in the lateral direction in a state illustrated in FIG. 4 (opened state). Namely, the damper plate 19 has a rectangular shape corresponding to a cross-sectional shape of the ventilation flue 21.

A shaft part 81 provided at a right end part of the damper plate 19 is inserted into a right-side face of the retainer 11 and pivotally supported. The register 10 according to the present embodiment includes an opening and closing operation mechanism 83 for turning the damper plate 19 on a left-side surface of the retainer 11. The opening and closing operation mechanism 83 includes an operation dial 85, a link rod 86, and a damper connection member 87. The operation dial 85 is provided at a left end of the bezel 13. The operation dial 85 is turnably held by the bezel 13 in a state where an arc-shaped operation part is inserted into a knob opening 36 provided at a left-side portion of the bezel 13. The operation dial 85 turns in the vertical direction when a user turns the operation part of the operation dial 85 exposed from the knob opening 36.

The link rod 86 formed into a rod shape extending in the front-rear direction has a front end connected to the operation dial 85. The link rod 86 has a rear end connected to the damper connection member 87. The link rod 86 transmits a turning driving force of the operation dial 85 to the damper connection member 87. The damper connection member 87 turnably supports a center part at a left end of the damper plate 19. The damper plate 19 turns in the vertical direction following turning of the damper connection member 87. Accordingly, the damper plate 19 turns following the turning of the damper connection member 87 that is turned by the turning driving force of the operation dial 85. A user turns the damper plate 19 by operating the operation dial 85 and can open/close the ventilation flue 21 by the damper plate 19.

Figure 10:
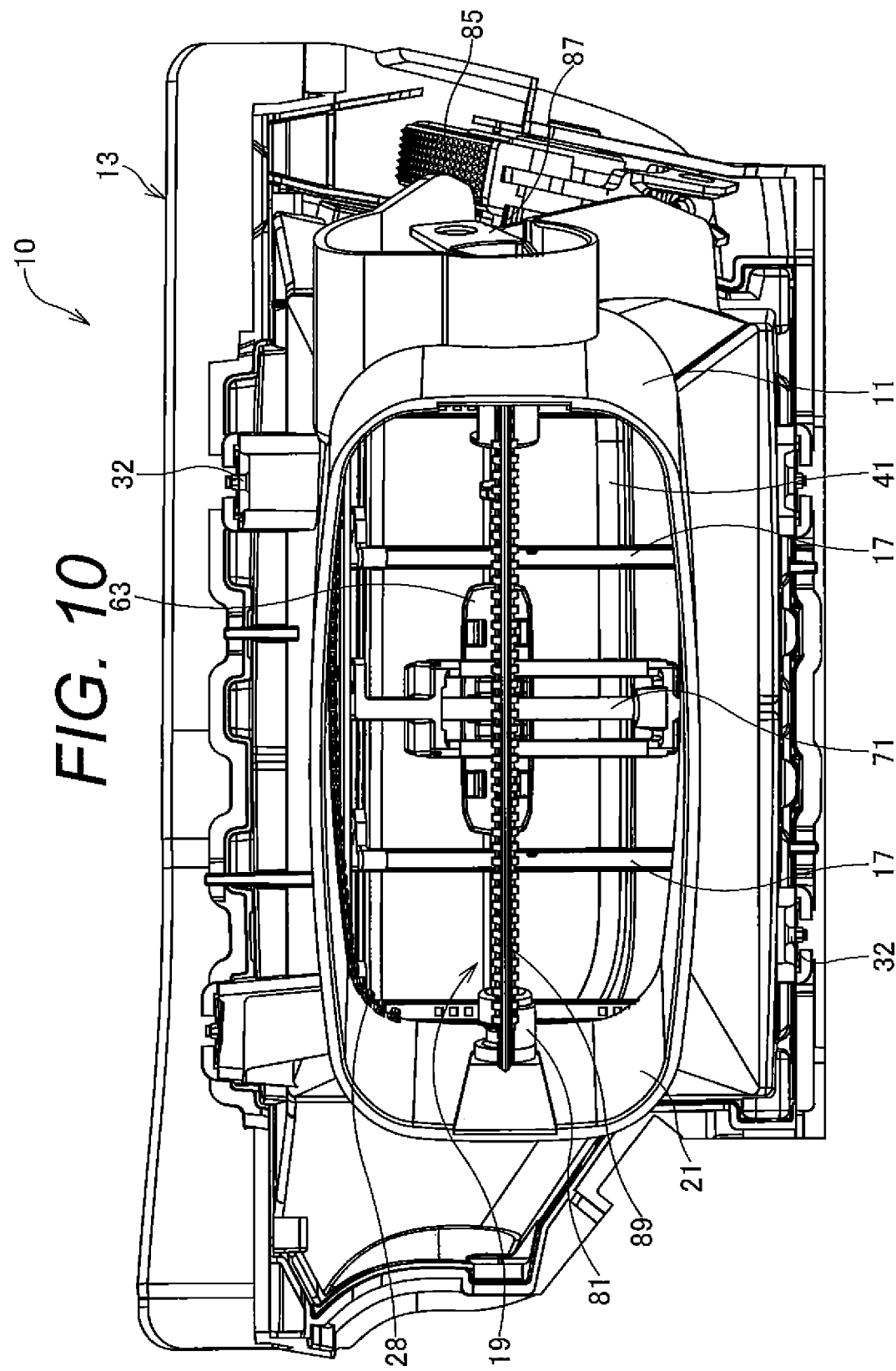
FIG. 10 is a rear view of the register.

A soft seal member 89 is provided around the damper plate 19. The soft seal member 89 is provided throughout a whole circumference of the damper plate 19. FIG. 10 is a rear view of the register 10 seen from a rear side. As shown in FIG. 10, a flexible seal member 28 is provided on an upper inner peripheral surface of the retainer 11. The flexible seal member 28 is provided at a position corresponding to a turning position of the damper plate 19. The damper plate 19 turns so as to be in a state where the plane is along the vertical direction, and the soft seal member 89 provided around the damper plate 19 is elastically brought into contact with the inner peripheral surface of the retainer 11 and the flexible seal member 28 to close the ventilation flue 21. The flexible seal member 28 may be provided throughout a whole circumference of the inner peripheral surface of the retainer 11. The flexible seal member 28 may not be provided in the retainer 11.

(With Respect to an Inclined Surface of the Bezel 13)

Figure 11:
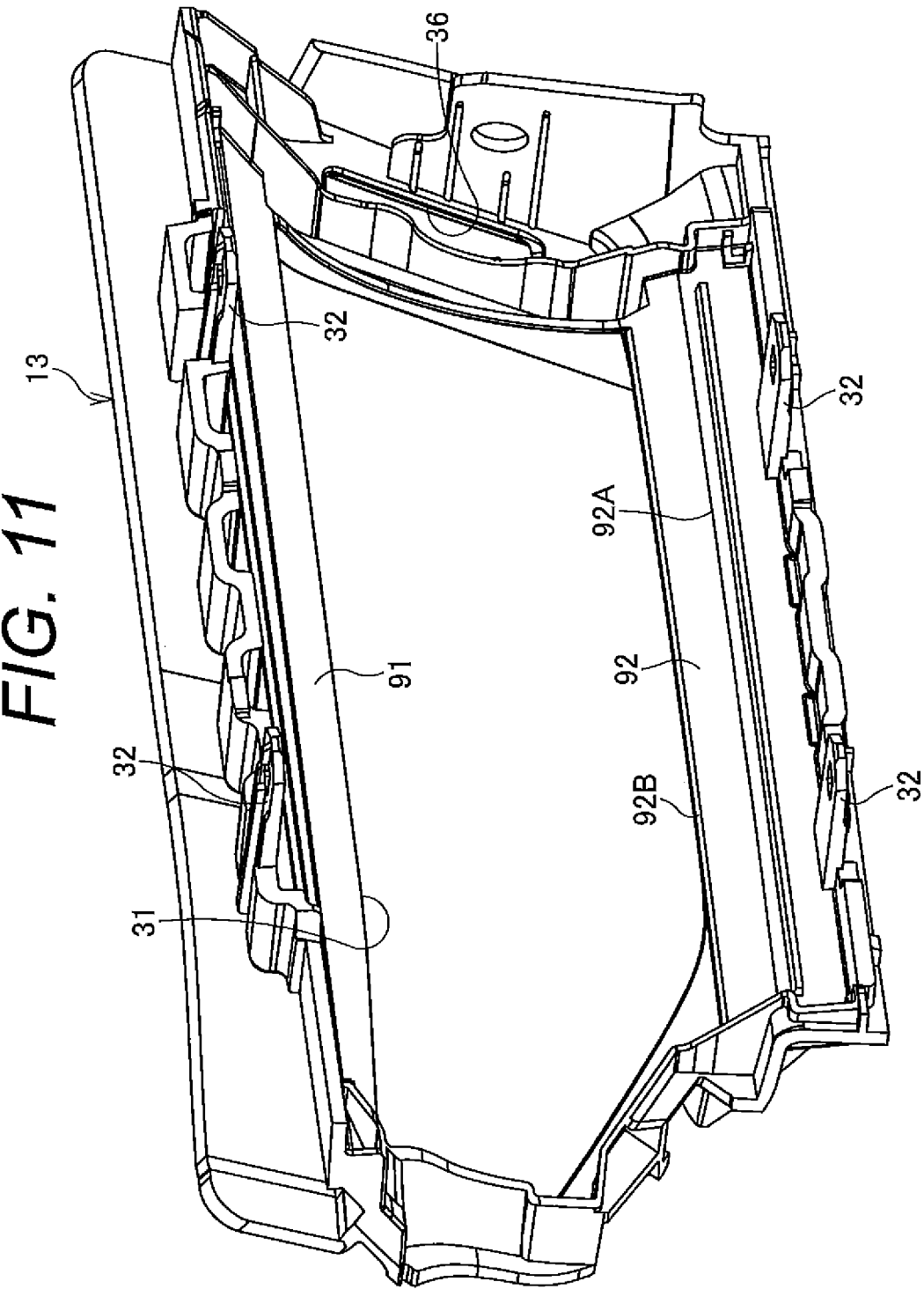
FIG. 11 is a perspective view of a bezel seen from the rear side.

The bezel 13 according to the present embodiment has the inclined surface on an inner peripheral surface thereof. Specifically, FIG. 11 is a perspective view of the bezel 13 seen from a rear side. As shown in FIGS. 3 and 11, the bezel 13 according to the present embodiment has upstream side inclined surfaces 91, 92 formed on inner peripheral surfaces facing with each other in a shorter side direction (vertical direction) of the air blow outlet 31, i.e. each of the inner peripheral surfaces on the upper side and the lower side. The upstream side inclined surfaces 91, 92 incline toward the downstream side from the upstream side, i.e. toward the front side from the rear side of the air blowing direction 22 in an inner side direction where the upstream side inclined surfaces 91, 92 approach the annular fin portion 41. The upstream side inclined surfaces 91, 92 are formed continuously along the lateral direction in the air blow outlet 31 of the bezel 13. Therefore, the upstream side inclined surface 91 is entirely formed along the lateral direction in an upper opening of the air blow outlet 31 (see FIG. 11). Likewise, the upstream side inclined surface 92 is entirely formed along the lateral direction in a lower opening of the air blow outlet 31 (see FIG. 11). Accordingly, each of the upstream side inclined surfaces 91, 92 according to the present embodiment is continuously formed in the longitudinal direction (lateral direction) of the air blow outlet 31 adjusting to a length of the annular fin portion 41 in the longitudinal direction (lateral direction). The upstream side inclined surfaces 91, 92 may be formed not in the entirety of the air blow outlet 31 in the lateral direction but only in a part thereof.

The upstream side inclined surfaces 91, 92 incline toward the front-rear direction (the air blowing direction 22) by a prescribed angle. An upstream side end 91A of the upstream side inclined surface 91 on the upper side is disposed at a front end of the retainer 11 (the downstream side opening 23), i.e. a connection part of the retainer 11 and the bezel 13. A downstream side end 91B of the upstream side inclined surface 91 faces an upstream side end 15A of the upper flat portion 51 of the annular fin portion 41 in the vertical direction. The air conditioning air flowing in the ventilation flue 21 in the air blowing direction 22 is blown downward toward the fin outer peripheral surface 56 of the upper flat portion 51 along the upstream side inclined surface 91.

An upstream side end 92A of the upstream side inclined surface 92 on the lower side is disposed at the front end of the retainer 11 (the downstream side opening 23), i.e. the connection part of the retainer 11 and the bezel 13. A downstream side end 92B of the upstream side inclined surface 92 faces a substantially center part in the front-rear direction of the lower flat portion 52 of the annular fin portion 41 in the vertical direction. The air conditioning air flowing in the ventilation flue 21 in the air blowing direction 22 is blown upward toward the fin outer peripheral surface 56 of the lower flat portion 52 along the upstream side inclined surface 92. As described above, the upstream side inclined surfaces 91, 92 guide the air conditioning air to the fin outer peripheral surface 56 of the annular fin portion 41. Therefore, an inclined angle of the upstream side inclined surfaces 91, 92 is set according to, for example, a position of the annular fin portion 41 and a shape of the fin outer peripheral surface 56. The air blow outlet 31 of the bezel 13 is narrowed at the downstream side end 91B of the upstream side inclined surface 91 and the downstream side end 92B of the upstream side inclined surface 92.

As shown in FIGS. 2 and 3, the bezel 13 according to the present embodiment has a downstream side inclined surface 93 formed continuously with the downstream side end 91B of the above-mentioned upstream side inclined surface 91. The bezel 13 has a downstream side inclined surface 94 formed continuously with the downstream side end 92B of the upstream side inclined surface 92. The two downstream side inclined surfaces 93, 94 incline toward the downstream side from the upstream side in the front-rear direction (the air blowing direction 22) in a direction separating from the annular fin portion 41, i.e. a direction toward which the air blow outlet 31 is expanded.

An upstream side end of the downstream side inclined surface 93 on the upper side is connected to the downstream side end 91B of the upstream side inclined surface 91. The downstream side inclined surface 93 inclines upward toward the front side from the rear side. A downstream side end 93B of the downstream side inclined surface 93 faces the upper flat portion 51 in the vertical direction.

An upstream side end of the downstream side inclined surface 94 on the lower side is connected to the downstream side end 92B of the upstream side inclined surface 92. The downstream side inclined surface 94 inclines downward toward the front side from the rear side. A downstream side end 94B of the downstream side inclined surface 94 is positioned on the front side relative to a front end of the lower flat portion 52.

An inclined angle of the downstream side inclined surfaces 93, 94 according to the present embodiment is, for example, an angle parallel with the fin outer peripheral surface 56 of the annular fin portion 41 turned to a position where turning is restricted as described later (see FIGS. 13 and 14). The air conditioning air flowing outside the annular fin portion 41 (upper side or lower side) is blown toward the annular fin portion 41 by the upstream side inclined surfaces 91, 92 and then flows along the fin outer peripheral surface 56 of the annular fin portion 41 and the downstream side inclined surfaces 93, 94.

(With Regard to an Inclined Surface, Upstream End of the Annular Fin Portion 41)

The annular fin portion 41 according to the present embodiment has an inclined surface on the rear side (upstream side). Specifically, as shown in FIGS. 3 and 7, the annular fin portion 41 has a fin inclined surface 103 formed in an opening on the upstream side (rear side) of the through hole 41A in the front-rear direction (the air blowing direction 22), i.e. an upstream side opening 101. The fin inclined surface 103 according to the present embodiment is formed throughout a whole circumference of the upstream side opening 101 having an annular shape (see FIG. 7). The fin inclined surface 103 may be formed only in a part of the whole circumference of the upstream side opening 101 or only in an upper edge and a lower edge of the upstream side opening 101.

The fin inclined surface 103 is formed in the fin inner peripheral surface 55 of the annular fin portion 41. The fin inclined surface 103 inclines toward a radial outside of the through hole 41A toward the upstream side from the downstream side. Accordingly, an inner diameter of the through hole 41A is larger on the rear side than the front side at a portion where the fin inclined surface 103 is formed. As shown in FIG. 3, in an upper side part, the fin inclined surface 103 according to the present embodiment is formed from a substantially center part to a rear end in the front-rear direction of the upper flat portion 51. In a lower side part, the fin inclined surface 103 is formed from a position on a front side (downstream) of a center part to a rear end in the front-rear direction of the lower flat portion 52.

A leading end on the upstream side of the upstream side opening 101, i.e. the upstream side end 15A has a cross section cut in a plane orthogonal to the longitudinal direction (lateral direction) of the air blow outlet 31, i.e. a cross section formed into an arc shape as shown in FIG. 3. The upstream side end 15A is formed into an arc shape with a prescribed angle and thus a round shape. A part of the air conditioning air blown through the ventilation flue 21 from the upstream side hits the upstream side end 15A.

(Adjustment of the Blow Out Direction in the Lateral Direction)

Next, with respect to the register 10 having a configuration described above, a method for adjusting the blow out direction of the air conditioning air to the vertical and lateral direction will be described. Firstly, a case where the blow out direction of the air is adjusted to the lateral direction will be described. A front end and a rear end of the guide fin 45 shown in FIGS. 3 and 4 are the same height, and a state where a front end and a rear end of the rear fin 17 are in the same position in the lateral direction is a neutral state.

Figure 12:
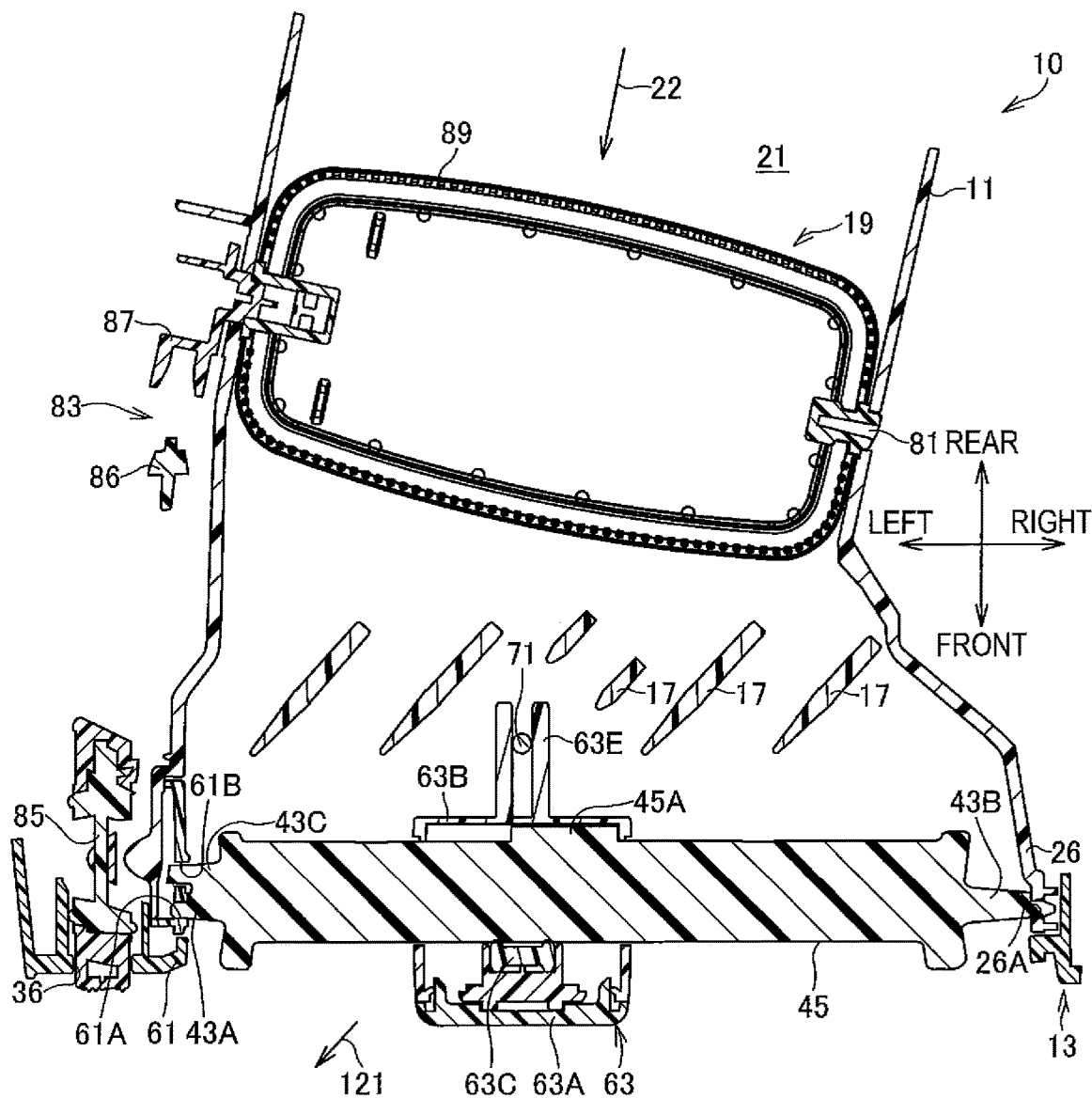
FIG. 12 is a sectional view showing a state where an operation knob is slidingly moved in the left direction to adjust the blowout direction of the air conditioning air to the left side.

For example, a user slide-moves the operation knob 63 in the lateral direction with respect to the guide fin 45. FIG. 12 shows a state where the operation knob 63 is slid in the left direction. For example, the operation knob 63 is slid in the left direction to a position engaging with the engaging part 45A of the front fin 15. Following this operation, a power for sliding the operation knob 63 is transmitted to the central rear fin 17 via the bifurcated arm 63E and the link mechanism 71.

The central rear fin 17 turns in the left direction following the slide-movement of the operation knob 63. The rear fins 17 other than the central rear fin 17 is transmitted with a turning driving force by the link member 79 (see FIG. 1) and turn following the turning of the central rear fin 17. The rear fins 17 turn so that the front end is the left side and the rear end is the right side. The slide-movement of the operation knob 63 in the left direction as described above enables adjusting a blow out direction 121 of air to a desired left direction. A case where the operation knob 63 is slide-moved in the right direction will be omitted in the description below since that case is merely in inverse relation to the case where the operation knob 63 is slide-moved in the left direction.
(Adjustment of the Blow Out Direction in the Vertical Direction)

Next, a case where the blow out direction 121 of the air is adjusted in the vertical direction will be described. For example, the front fin 15 is turned upward from a horizontal state (neutral state) and the blow out direction 121 of the air is adjusted upward. FIG. 13 shows a state where the operation knob 63 is turned upward. For example, a user operates the operation knob 63 to turn the front fin 15 to the upper direction and adjusts the front fin 15 so that the front end is on the upper side and the rear end is on the lower side. FIG. 13 shows a state where the operation knob 63 is turned upward to the maximum. In this case, the front fin 15 is in a state where the turning of the front fin 15 to the upper direction is restricted by engaging the auxiliary support shaft 43C with the insertion hole 61B (see FIG. 4).

The bifurcated arm 63E connecting the front fin 15 and the rear fin 17 moves downward following turning of the guide fin 45 of the front fin 15. The bifurcated arm 63E slide-moves downward with the connection rod of the link mechanism 71 sandwiched therebetween in the lateral direction. The central rear fin 17 does not turn in the lateral direction since the power is not transmitted to the link mechanism 71 from the bifurcated arm 63E following the movement of the bifurcated arm 63E. The neutral state of the rear fin 17 is maintained. As a result, the neutral states of all the rear fins 17 are maintained. The blow out direction 121 of the air conditioning air blown out from the air blow outlet 31 is changed upward by the front fin 15.

In the register 10 without the conventional upstream side inclined surface 91 etc., for example, the ventilation flue 21 of the air conditioning air is narrow at a portion between the fin outer peripheral surface 56 of the upper flat portion 51 and the inner peripheral surface of the bezel 13. Accordingly, the air conditioning air may accelerate in flowing outside (upper side) the annular fin portion 41 (the upper flat portion 51). The air conditioning air accelerated after passing through the upper side of the upper flat portion 51 hits the air conditioning air whose pass inside the annular fin portion 41 (between the upper flat portion 51 and the guide fin portion 45) and whose blow out direction 121 is changed upward. The air conditioning air whose blow out direction 121 is changed upward by the front fin 15 hits the air conditioning air accelerated after passing outside the upper flat portion 51, and the blow out direction 121 is changed so as to blow toward the front side. As a result, the air conditioning air hardly flows in a direction toward which the front fin 15 turns and the directivity of the air conditioning air is deteriorated. When the operation knob 63 turns downward, the blow out direction 121 of the air conditioning air passing through the annular fin portion 41 is similarly changed so as to blow toward the front side by the air conditioning air accelerated after passing between the lower flat portion 52 and the inner peripheral surface of the bezel 13. When a sufficient gap is provided between the fin outer peripheral surface 56 of the annular fin portion 41 and the inner peripheral surface of the bezel 13, the blow out direction 121 of the air conditioning air passing outside the front fin 15 is not changed by the bezel 13 and the front fin 15, and the air conditioning air is blown out toward the front side along the front-rear direction. As a result, the directivity of the air conditioning air is deteriorated.

In the bezel 13 according to the present embodiment, as indicated by an arrow in FIG. 13, the air conditioning air flowing on the upper side of the upper flat portion 51 is guided to the upper flat portion 51 side by the upstream side inclined surface 91. The air conditioning air is blown toward the fin outer peripheral surface 56 of the upper flat portion 51 along the upstream side inclined surface 91. The air conditioning air flowing toward the fin outer peripheral surface 56 is merged with the air conditioning air flowing along the fin outer peripheral surface 56 or the air blowing direction thereof is changed after hitting the fin outer peripheral surface 56. As a result, the air conditioning air flowing on the upper side (outside) of the upper flat portion 51 flows along the fin outer peripheral surface 56 of the upper flat portion 51 or flows upward after hitting the fin outer peripheral surface 56. Namely, the blowing direction of the air conditioning air flowing on the upper side of the upper flat portion 51 can be changed to a direction along the blowing direction of the air conditioning air flowing inside the annular fin portion 41 (the desired upward blow out direction 121), which can improve the directivity of the air conditioning air.

Further, in the bezel 13 according to the present embodiment, the downstream side inclined surface 93 is provided on the downstream side of the upstream side inclined surface 91. As shown in FIG. 13, the inclined angle of the downstream side inclined surface 93 on the upper side is an angle substantially in parallel with the fin outer peripheral surface 56 of the upper flat portion 51 turned upward to a position where turning is restricted by the auxiliary support shaft 43C etc. The fin outer peripheral surface 56 of the upper flat portion 51 and the downstream side inclined surface 93 are substantially in parallel with each other. The air conditioning air flowing along the upstream side inclined surface 91 and the fin outer peripheral surface 56 of the upper flat portion 51 is blown in the desired blow out direction 121, i.e. upward more surely after passing through a ventilation flue sandwiched between the upper flat portion 51 and the downstream side inclined surface 93.

The air conditioning air guided by the upstream side inclined surface 92 on the lower side is guided between the lower flat portion 52 and the guide fin 45 in the vertical direction (the through hole 41A). Thus, the air conditioning air flowing along the upstream side inclined surface 92 can be blown in the desired blow out direction 121 (upward).

FIG. 14 shows a state where the operation knob 63 is turned downward. For example, a user operates the operation knob 63 to turn the front fin 15 downward and adjusts the front fin 15 so that the front end is on the lower side and the rear end is on the upper side. FIG. 14 shows a state where the operation knob 63 is turned to the lowest side. In this case, the front fin 15 is in a state where turning in the lower direction is restricted by engaging the auxiliary support shaft 43C with the insertion hole 61B (see FIG. 4).

As indicated by an arrow in FIG. 14, the air conditioning air flowing on the lower side of the lower flat portion 52 is guided to the lower flat portion 52 by the upstream side inclined surface 92. The air conditioning air flowing toward the lower flat portion 52 is merged with the air conditioning air flowing along the fin outer peripheral surface 56 of the lower flat portion 52 or the air blowing direction thereof is changed after hitting the fin outer peripheral surface 56. As a result, the air conditioning air flowing on the lower side (outside) of the lower flat portion 52 flows along the fin outer peripheral surface 56 of the lower flat portion 52 or flows downward after hitting the fin outer peripheral surface 56, which can improve the directivity of the air conditioning air.

Further, as shown in FIG. 14, the inclined angle of the downstream side inclined surface 94 on the lower side is an angle substantially in parallel with the fin outer peripheral surface 56 of the lower flat portion 52 turned downward to a position where turning is restricted by the auxiliary support shaft 43C etc. The fin outer peripheral surface 56 of the lower flat portion 52 and the downstream side inclined surface 94 are substantially in parallel with each other. The air conditioning air flowing along the upstream side inclined surface 92 and the fin outer peripheral surface 56 of the lower flat portion 52 is blown in the desired blow out direction 121, i.e. downward more surely after passing through a ventilation flue sandwiched between the lower flat portion 52 and the downstream side inclined surface 94.

The air conditioning air guided by the upstream side inclined surface 91 on the upper side is guided between the upper flat portion 51 and the guide fin 45 in the vertical direction (the through hole 41A). Thus, the air conditioning air flown along the upstream side inclined surface 91 can be blown in the desired blow out direction 121 (downward). As described above, the turning of the operation knob 63 in the vertical direction enables adjusting the air blow direction 121 of the air to the desired vertical direction.

The fin inclined surface 103 is formed at a portion on the upstream side of the annular fin portion 41 according to the present embodiment. The inner diameter of the through hole 41A (see FIG. 7) is larger on the rear side than the front side at the portion where the fin inclined surface 103 is formed. Namely, the annular fin portion 41 has a shape opening the upstream side opening 101 (see FIG. 7) more largely. Thus, for example, in a case shown in FIG. 13, the much more air conditioning air flowing upward along the upstream side inclined surface 92 on the lower side can be taken in the annular fin portion 41 (between the lower flat portion 52 and the guide fin 45). In a case shown in FIG. 14, the much more air conditioning air flowing downward along the upstream side inclined surface 91 on the upper side can be taken in the annular fin portion 41 (between the upper flat portion 51 and the guide fin 45). As a result, the much more air conditioning air can pass through the through hole 41A and the air blowing direction 22 can be changed to the desired blow out direction 121 by the front fin 15, which can more improve the directivity of the air conditioning air.

In the above embodiment, the front fin 15 is one example of the movable fin. The fin shafts 43A, 43B are one example of a shaft portion. The auxiliary support shaft 43C and the insertion hole 61B are one example of a restriction part. The upstream side inclined surfaces 91, 92 are one example of an inner peripheral surface. The downstream side inclined surfaces 93, 94 are one example of an outer peripheral surface.

According to the above embodiment, the following effect is brought out.

(1) The register 10 according to the present embodiment includes a bezel 13 formed with the narrow air blow outlet 31 long in one direction (lateral direction), the retainer 11 having a cylindrical shape communicating with the air blow outlet 31 and blowing the air conditioning air in the air blowing direction 22 toward the air blow outlet 31, and the front fin 15 (movable fin) provided inside the air blow outlet 31. The front fin 15 includes the annular fin portion 41 and the fin shafts 43A, 43B (shaft portion). The annular fin portion 41 has an annular shape having the through hole 41A formed so as to penetrate in the air blowing direction 22 and is extended in the longitudinal direction (lateral direction) of the air blow outlet 31. The fin shafts 43A, 43B are provided at the outer peripheral portion of the annular fin portion 41 and are turnably supporting the annular fin portion 41. The bezel 13 includes the upstream side inclined surfaces 91, 92 formed on at least one of the inner peripheral surfaces facing with each other in the shorter side direction (vertical direction) of the air blow outlet 31. The upstream side inclined surfaces 91, 92 incline toward a direction of approaching the annular fin portion 41 from the upstream side toward the downstream side of the air blowing direction 22.

According to the above technical effect, the blow out direction 121 toward which the air conditioning air is blown out from the air blow outlet 31 of the bezel 13 can be changed by turning the front fin 15 (the annular fin portion 41). The upstream side inclined surfaces 91, 92 are formed on the inner peripheral surfaces facing with each other in the shorter side direction (vertical direction) in the air blow outlet 31 of the bezel 13 and incline toward a direction of approaching the annular fin portion 41 (inner side of the bezel 13) from the upstream side toward the downstream side of the air blowing direction 22.

The ventilation flue 21 of the air conditioning air may be narrow at a portion sandwiched between the fin outer peripheral surface 56 of the annular fin portion 41 and the inner peripheral surface of the bezel 13 in the shorter side direction (vertical direction) of the air blow outlet 31. The air conditioning air flowing outside the annular fin portion 41 and in this narrow ventilation flue 21 flows along the upstream side inclined surfaces 91, 92 and is blown to the annular fin portion 41 side. The air conditioning air flowing outside the annular fin portion 41 is merged with the air conditioning air flowing along the fin outer peripheral surface 56 of the annular fin portion 41 and attempts to flow along the fin outer peripheral surface 56 of the annular fin portion 41. Thus, the air conditioning air flowing outside the annular fin portion 41 flows along the fin outer peripheral surface 56 of the annular fin portion 41 and flows toward the air blowing direction 22 of the air conditioning air flowing in the annular fin portion 41 (the through hole 41A), i.e. the desired blow out direction 121. As a result, the directivity of the air conditioning air in the turning direction of the front fin 15 can be improved.

It is not necessary to provide an auxiliary fin turning in interlock with the annular fin portion 41, and the directivity can be improved by providing the upstream side inclined surfaces 91, 92 on the inner peripheral surface of the bezel 13. The number of fin with respect to one shaft is increased, and the directivity of the air conditioning air can be improved by providing the annular-shaped annular fin portion 41 in the fin shafts 43A, 43B. In the present embodiment, three fins (the upper flat portion 51, the lower flat portion 52, and the guide fin 45) are provided with respect to one shaft (the fin shafts 43A, 43B). Accordingly, in the register 10 according to the present embodiment, the directivity of the air conditioning air can be improved while suppressing increase in the number of parts.

(2) The upstream side inclined surfaces 91, 92 are formed continuously in the longitudinal direction (lateral direction) of the air blow outlet 31 adjusting to the length of the annular fin portion 41 in the longitudinal direction (lateral direction) of the air blow outlet 31.

According to the above technical feature, the upstream side inclined surfaces 91, 92 are continuously formed along the lateral direction (longitudinal direction) adjusting to the length of the annular fin portion 41. On the inner peripheral surface of the air blow outlet 31, the upstream side inclined surfaces 91, 92 are formed at a position facing the annular fin portion 41. Thus, the directivity of the air conditioning air when the front fin 15 is turned can be more improved.

(3) The bezel 13 includes the downstream side inclined surfaces 93, 94 formed continuously with the downstream side ends 91B, 92B of the downstream side inclined surfaces 91, 92. The downstream side inclined surfaces 93, 94 incline toward the downstream side from the upstream side in the air blowing direction 22 in the direction separating from the annular fin portion 41 (upward or downward).

According to the above technical feature, the air conditioning air flowing outside the annular fin portion 41 flows along the fin outer peripheral surface 56 of the annular fin portion 41 and the downstream side inclined surfaces 93, 94 after blown to the annular fin portion 41 side by the upstream side inclined surfaces 91, 92. Accordingly, the directivity of the air conditioning air can be more improved by setting an inclined angle of the downstream side inclined surfaces 93, 94 to an angle corresponding to the blow out direction 121.

(4) The annular fin portion 41 includes the fin inclined surface 103 formed in the opening on the upstream side of the through hole 41A in the air blowing direction 22, i.e. the upstream side opening 101. The fin inclined surface 103 inclines toward the radial outside of the through hole 41A from the downstream side toward the upstream side of the air blowing direction 22.

According to the above technical feature, the annular fin portion 41 can increase the inner diameter of the upstream side opening 101 by being provided with the fin inclined surface 103. Accordingly, for example, when the front fin 15 turns, the air conditioning air that the air blowing direction 22 is changed to the direction toward the annular fin portion 41 by the upstream side inclined surfaces 91, 92 can be taken in the annular fin portion 41 (the through hole 41A) to flow along the fin inner peripheral surface 55 of the annular fin portion 41 (see an arrow in FIGS. 13 and 14). As a result, the directivity of the air conditioning air can be improved.

(5) The fin inclined surface 103 is formed throughout the whole circumference of the upstream side opening 101 having the annular shape.

According to the above technical feature, the more air conditioning air whose the air blowing direction 22 is changed by the upstream side inclined surfaces 91, 92 can be taken in the annular fin portion 41 by providing the fin inclined surface 103 throughout the whole circumference of the upstream side opening 101, and the directivity can be more improved.

(6) The annular fin portion 41 includes the opening on the upstream side of the through hole 41A in the air blowing direction 22, i.e. the upstream side opening 101. The end on the upstream side of the upstream side opening 101 (the upstream side end 15A) has a cross section cut in a plane orthogonal to the longitudinal direction (lateral direction) of the air blow outlet 31 and formed into the arc shape (see FIG. 3).

For example, when the end on the upstream side of the annular fin portion 41 (the upstream side end 15A) is configured by an flat surface, the air conditioning air flowing from the upstream side may hit the flat surface of the annular fin portion 41 (the upstream side end 15A), flow in such a way as to separate from the annular fin portion 41, and then generate the vortex. Thus, abnormal noise such as wind noise may be generated. With respect to this technical problem, in the register 10 according to the present embodiment, the air conditioning air flowing from the upstream side flows along a surface of the annular fin portion 41 by forming the upstream side end 15A of the annular fin portion 41 into the arc shape, and thus generation of the vortex and the abnormal noise can be suppressed.

(7) The register 10 according to the present embodiment includes a restriction part for restricting a turning position of the front fin 15 (the auxiliary support shaft 43C and the insertion hole 61B). The inclined angle of the downstream side inclined surfaces 93, 94 is an angle in parallel with the annular fin portion 41 turned to a position restricted by the restriction part (the auxiliary support shaft 43C) (see FIGS. 13 and 14).

According to the above technical feature, the directivity of the air conditioning air can be more surely improved in a turning range of the annular fin portion 41, i.e. a range where the blow out direction 121 is changeable by setting the inclined angle of the downstream side inclined surfaces 93, 94 to an angle in parallel with the surface of the annular fin portion 41 turned to a position where the turning is restricted. When the annular fin portion 41 is turned to a maximum swing width, the directivity can be effectively improved by making the downstream side inclined surfaces 93, 94 and the annular fin portion 41 parallel to each other.

The present invention is not limited to the above embodiment and various improvements and modifications can be done within the scope of the present invention.

For example, although the air blow outlet 31 is extended in the lateral direction, for example, the air blow outlet 31 may also be extended in a direction forming a prescribed angle with the vertical direction and the lateral direction.

The register 10 may not be provided with the rear fin 17.

The bezel 13 may be provided with only either one of the upstream side inclined surfaces 91 and 92 (the upstream side inclined surface 91 or the upstream side inclined surface 92).

Although the upstream side inclined surfaces 91, 92 are formed continuously in the lateral direction adjusting to the length of the annular fin portion 41 in the lateral direction, the upstream side inclined surfaces 91, 92 may be formed in different manners. The upstream side inclined surfaces 91, 92 may be formed as a part of the inner peripheral surface of the bezel 13 and in a plurality of divided parts in the lateral direction.

Although the fin inclined surface 103 is formed throughout the whole circumference of the upstream side opening 101 of the bezel 13, the fin inclined surface 103 may be formed in different manners. The fin inclined surface 103 may be formed at a part of the whole circumference of the upstream side opening 101 or at a plurality of parts of the whole circumference of the upstream side opening 101.

The annular fin portion 41 may not be provided with fin inclined surface 103.

Although the end on the upstream side of the front fin 15, i.e. the upstream side end 15A is formed into the arc shape, the upstream side end 15A may be formed in different manners. The upstream side end 15A may have a plate orthogonal to the air blowing direction 22. The upstream side end 15A may have an inclined surface forming a prescribed angle with the air blowing direction 22.

The register 10 may not include the restriction part (the auxiliary support shaft 43C and the insertion hole 61B). In this case, the front fin 15 can be turned to a position where the front fin 15 comes into contact with the bezel 13 etc. and turning thereof is restricted.

The front fin 15 may not be provided with the guide fin 45.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A register comprising:
   a bezel formed with an air blow outlet longer in a longitudinal direction;
   a retainer disposed upstream of the air blow outlet, the retainer having a cylindrical shape and directing an air conditioning air flow in an air blowing direction toward the air blow outlet; and
   a movable fin provided inside the air blow outlet,
   wherein the movable fin includes:
      an annular fin portion having an annular shape with a through hole formed so as to open toward the air blowing direction and extend in the longitudinal direction of the air blow outlet; and
      a shaft portion provided at an outer peripheral portion of the annular fin portion and turnably supporting the annular fin portion,
   wherein an inner fin is connected to an inner peripheral surface of the annular fin portion, and the annular fin portion includes a first flat portion and a second flat portion that are disposed so as to interpose the inner fin therebetween,
   wherein the bezel is attached to an opening of the retainer on a downstream side of the retainer,
   wherein the bezel includes inner peripheral surfaces facing each other in a vertical direction of the air blow outlet, at least two of the inner peripheral surfaces of the bezel are inclined in a converging direction toward the annular fin portion of and toward the air blowing direction,
   wherein the bezel includes outer peripheral surfaces formed continuously with downstream side ends of the inner peripheral surfaces of the bezel, the outer peripheral surfaces are inclined away from the annular fin portion downstream of the inner peripheral surfaces of the bezel and away from the air blowing direction,
   wherein the air blow outlet is formed continuously with downstream side ends of the outer peripheral surfaces, and
   a turning axis of the shaft portion is disposed, in the air blowing direction, between a downstream side end of the annular fin portion and a straight line connecting each of the downstream side ends of the at least two of the inner peripheral surfaces of the bezel, in a cross-sectional view cut plane orthogonal to the longitudinal direction of the air blow outlet,
   wherein the inner fin has a plate shape in the longitudinal direction of the air blow outlet and has each end thereof in the longitudinal direction connected to side portions of the inner peripheral surface of the annular fin portion,
   a downstream end of the first flat portion is arranged at an upstream side of a downstream end of the inner fin in the air blowing direction,
   a downstream end of the second flat portion is arranged at a downstream side of each downstream side end of the at least two inner peripheral surfaces of the bezel, and
   the downstream end of the second flat portion is arranged at a downstream side of a downstream end of the inner fin.

2. The register according to claim 1, wherein the inner peripheral surfaces of the bezel are formed continuously such that the lateral width in the longitudinal direction of the air blow outlet corresponds to a length of the annular fin portion in the longitudinal direction of the air blow outlet.

3. The register according to claim 1, wherein the annular fin portion includes upstream side fin inclined surfaces on an upstream side of the through hole in the air blowing direction, and
   the fin inclined surfaces incline toward a radial outside of the through hole from the downstream side toward the upstream side of the air blowing direction.

4. The register according to claim 3, wherein the upstream side fin inclined surfaces are formed throughout a whole circumference of the opening having an annular shape.

5. The register according to claim 1, wherein the annular fin portion includes an upstream side opening that has a round leading end on an upstream side.

6. The register according to claim 1, further comprising a restriction part restricting a turning position of the movable fin,
   wherein an inclined angle of the outer peripheral surfaces is an angle in parallel with the annular fin portion turned to a position restricted by the restriction part.

* * * * *